(12) United States Patent
Livesey et al.

(10) Patent No.: US 12,163,004 B2
(45) Date of Patent: Dec. 10, 2024

(54) POLYMER COMPOSITES

(71) Applicant: WARNER BABCOCK INSTITUTE FOR GREEN CHEMISTRY, LLC, Mill Valley, CA (US)

(72) Inventors: Christopher William Livesey, Norwood, MA (US); Alexander Hsu, Belmont, MA (US); Brandon Ackley, Lowell, MA (US); Samuel Ellman, Somerville, MA (US); Frederick Richard Kearney, Walpole, MA (US); John C. Warner, Wilmington, MA (US); Joseph Luke Pont, New Castle, NH (US); James V. Babcock, Kentfield, CA (US)

(73) Assignee: Warner Babcock Institute for Green Chemistry, LLC, Mill Valley, CA (US)

( * ) Notice: Subject to any disclaimer, the term of this patent is extended or adjusted under 35 U.S.C. 154(b) by 0 days.

(21) Appl. No.: 18/476,585

(22) Filed: Sep. 28, 2023

(65) Prior Publication Data

US 2024/0101791 A1 Mar. 28, 2024

Related U.S. Application Data

(63) Continuation of application No. PCT/US2023/032895, filed on Sep. 15, 2023.
(Continued)

(51) Int. Cl.
*C08K 13/02* (2006.01)
*C08K 3/013* (2018.01)
(Continued)

(52) U.S. Cl.
CPC .............. *C08K 13/02* (2013.01); *C08L 23/14* (2013.01); *C08L 67/02* (2013.01); *C08L 67/04* (2013.01); *C08L 69/00* (2013.01); *C08L 75/04* (2013.01); *C08L 77/02* (2013.01); *C08L 77/06* (2013.01); *C08K 3/013* (2018.01); *C08K 3/18* (2013.01);
(Continued)

(58) Field of Classification Search
CPC ...................................................... C08K 13/02
See application file for complete search history.

(56) References Cited

U.S. PATENT DOCUMENTS

| 3,513,223 A | 5/1970 | Smart et al. |
| 2005/0119396 A1 * | 6/2005 | Papke ................. C08K 7/14 524/495 |

(Continued)

FOREIGN PATENT DOCUMENTS

CA 3089800 A1 * 8/2019 ......... B29C 45/0001

OTHER PUBLICATIONS

International Search Report for PCT Patent App. No. PCT/US23/32895 (Jan. 8, 2024).

*Primary Examiner* — Michael F Pepitone
(74) *Attorney, Agent, or Firm* — Cermak & McGowan LLP; Malcolm K. McGowan

(57) ABSTRACT

Described herein are improved thermoplastic composites, which demonstrate excellent physical properties, such as yield strength, ultimate tensile strength, toughness, elongation, and, optionally, superior tunable biodegradability when compared to known thermoplastics. The composite comprises minimally a thermoplastic polymer, at least one phenolic compound, and, optionally, a filler.

29 Claims, 4 Drawing Sheets

Related U.S. Application Data

(60) Provisional application No. 63/511,302, filed on Jun. 30, 2023, provisional application No. 63/407,362, filed on Sep. 16, 2022.

(51) Int. Cl.
| | |
|---|---|
| *C08K 3/18* | (2006.01) |
| *C08K 5/053* | (2006.01) |
| *C08K 5/101* | (2006.01) |
| *C08K 5/11* | (2006.01) |
| *C08L 23/14* | (2006.01) |
| *C08L 67/02* | (2006.01) |
| *C08L 67/04* | (2006.01) |
| *C08L 69/00* | (2006.01) |
| *C08L 75/04* | (2006.01) |
| *C08L 77/02* | (2006.01) |
| *C08L 77/06* | (2006.01) |

(52) U.S. Cl.
CPC .............. *C08K 5/053* (2013.01); *C08K 5/101* (2013.01); *C08K 5/11* (2013.01); *C08K 2201/014* (2013.01); *C08L 2201/06* (2013.01)

(56) References Cited

U.S. PATENT DOCUMENTS

| | | |
|---|---|---|
| 2010/0239489 A1 | 9/2010 | Harutyunyan et al. |
| 2016/0215106 A1 | 7/2016 | Jeong et al. |
| 2017/0175349 A1 | 6/2017 | Davis et al. |
| 2020/0399474 A1 | 12/2020 | Roumeli et al. |

\* cited by examiner

POLYMER COMPOSITES

CROSS-REFERENCE TO RELATED APPLICATIONS

This application is a continuation of PCT/US2023/032895, filed 15 Sep. 2023, which claims priority from U.S. Provisional Application 63/511,302, filed 30 Jun. 2023 and from U.S. Provisional Application 63/407,362, filed 16 Sep. 2022. The contents of these applications are incorporated herein by reference in their entirety.

BACKGROUND

The global plastics market is in excess of $500B annually. The most commonly-used plastics include commodity plastics such as polyethylene (PE), polypropylene (PP), and polyethylene terephthalate (PET), and engineered plastics such as acrylonitrile butadiene styrene (ABS), polyamide (PA; nylon), and polylactic acid ("PLA"). Often these plastics are used to form composite materials with inorganic fillers such as glass, carbon fiber, and/or metals; or with fillers such as minerals, natural fibers, and/or ceramics. Concerns with cost, performance, and biodegradability mean that there remains a need in the art for improved thermoplastic composites.

SUMMARY

Described herein are improved thermoplastic composites, which demonstrate excellent physical properties, such as yield strength, ultimate tensile strength, toughness, elongation, and, optionally, superior tunable biodegradability when compared to known thermoplastics. The composite comprises minimally a thermoplastic polymer, at least one phenolic compound, and, optionally, a filler. With selection of appropriate ingredients, composites described herein are useful for film extrusion, additive manufacturing, thermoforming, textile manufacturing, and injection molding.

DETAILED DESCRIPTION

Figure 1:
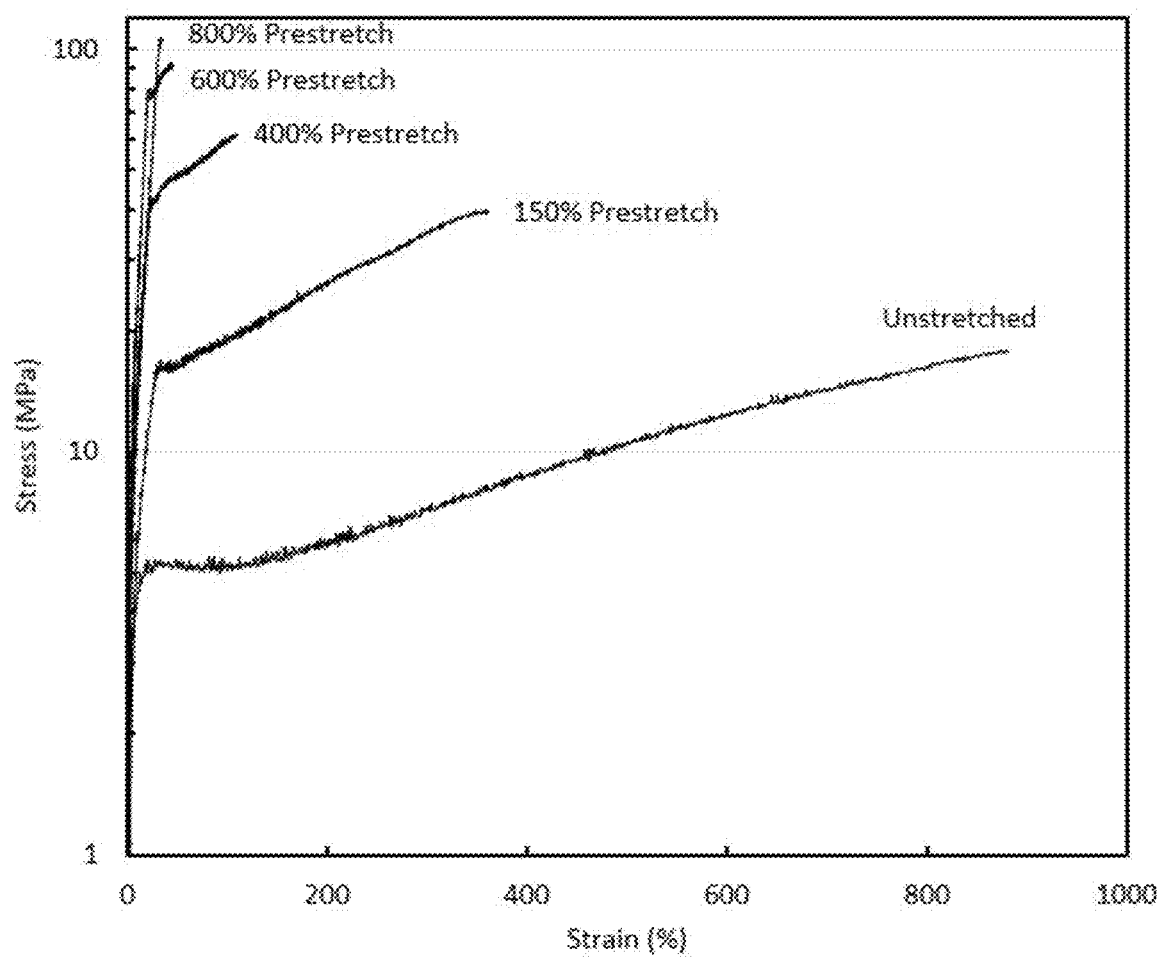
FIG. 1: Conservation of toughness energy at various prestretch ratios compared to unprestrained material, comparison of UTS at various prestretch ratios.
Figure 2:
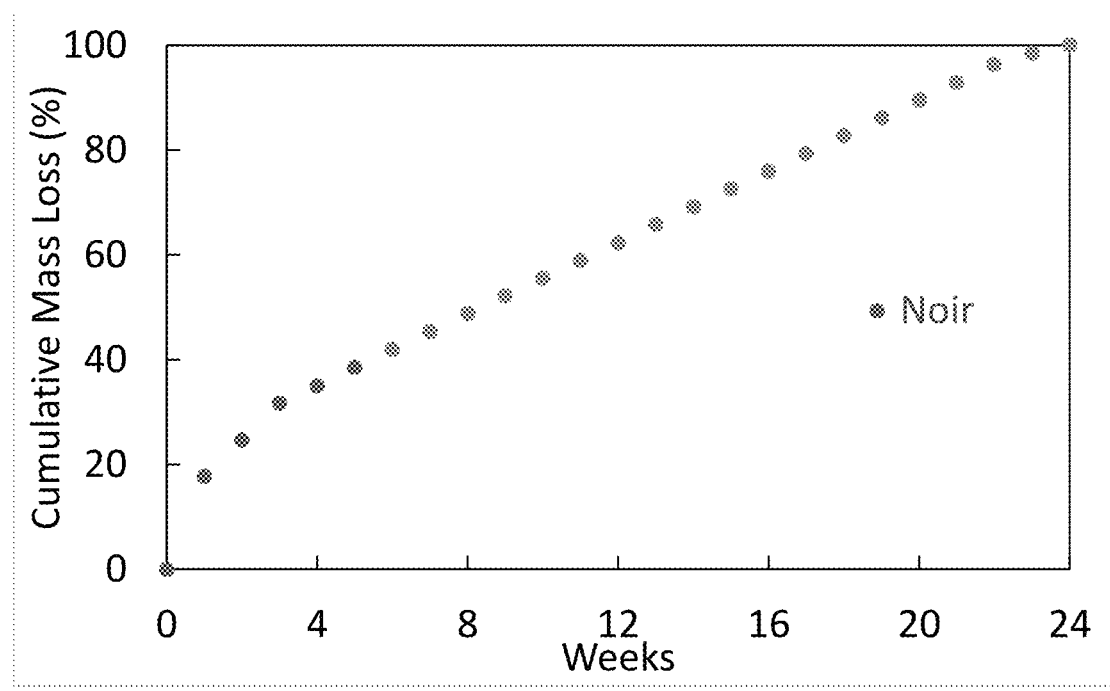
FIG. 2: Live biodegradation with projections over time.
Figure 3:
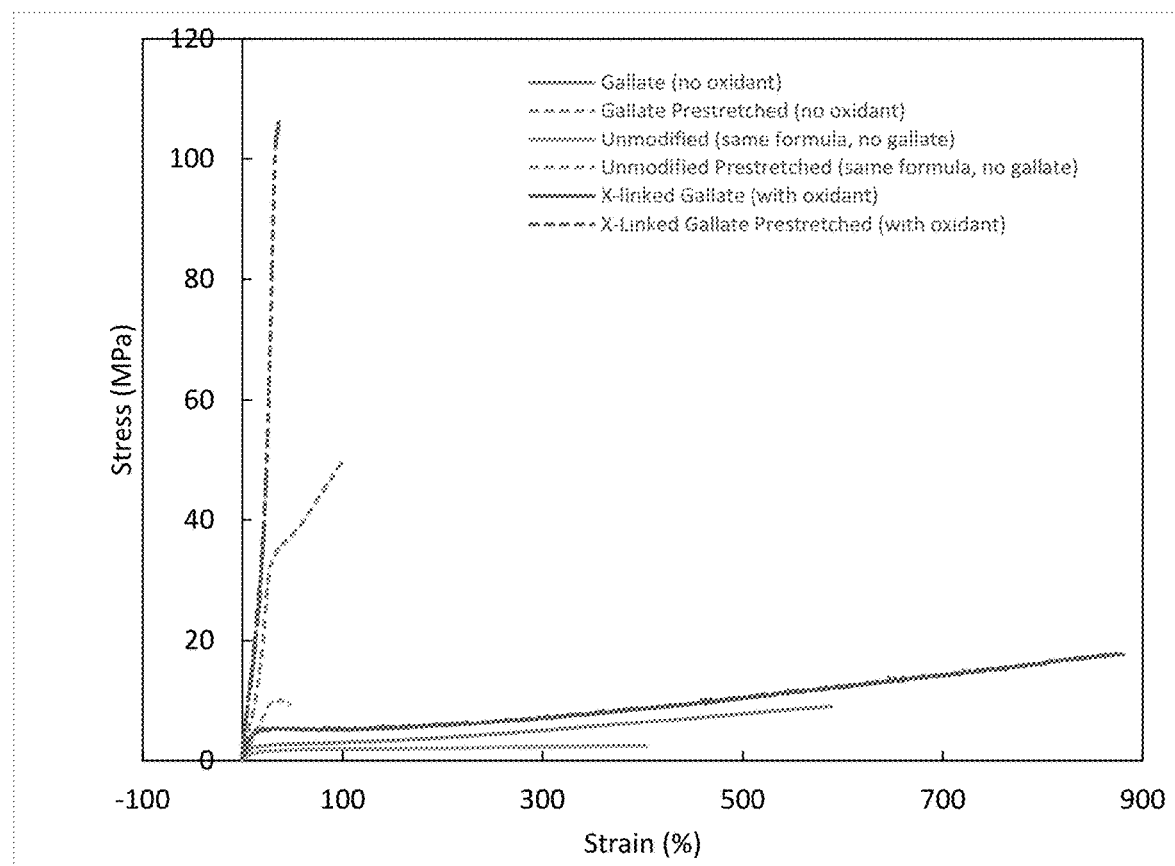
FIG. 3: Comparison of crosslinked gallate, gallate non-crosslinked, and no gallate in model thermoplastic system.
Figure 4:
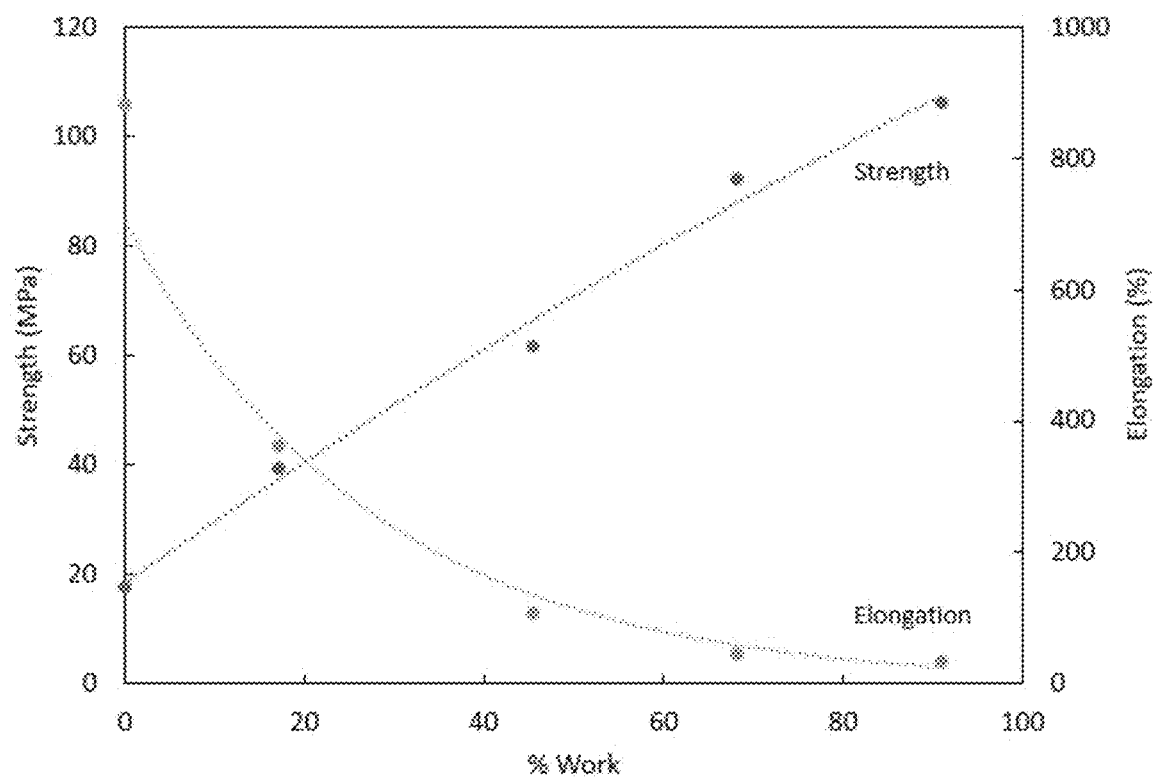
FIG. 4: Strength and elongation tunability as a function of percent work.

Unless defined otherwise, all technical and scientific terms used herein have the same meaning as is commonly understood by one of skill in the art. All patents and publications referred to herein are incorporated by reference.

As used in the specification and claims, the singular form "a," "an," and "the" include plural references unless the context clearly dictates otherwise.

Unless specified otherwise, ranges described herein include the endpoints of the ranges.

Unless specified otherwise, "about" means +/−1% of the measurement to which it refers. For example, a temperature of "about 100° C." means 99-101° C.

When the compounds described herein contain olefinic double bonds or other centers of geometric asymmetry, and unless specified otherwise, it is intended that the compounds include both E and Z geometric isomers.

Standards for biodegradability are known in the art. Standards of biodegradability are set forth in EN13432 and ISO 14851/14852. Biodegradability can vary according to environmental conditions, and standard test methods have been established in the art for measuring environmentally-dependent biodegradability, such as industrial/home compostability (ASTM D6400); biodegradation in anaerobic/aerobic environments (ASTM D5511); biodegradation in soil environments (ASTM 5988); biodegradation in freshwater environments (ASTM D5271, EN29408); and biodegradation in marine environments (ASTM D6691). Standard test methods for determination of biodegradability of biodegradable plastics are also known in the art (ASTM D6868/EN13432).

Described herein are improved thermoplastic composites produced from a combination of ingredients comprising about 1-99 wt % of a first polymer; about 0.1-15 wt % of a first phenolic compound; about 0-40 wt % of an alcohol; and about 0.001-5 wt % of a first Lewis acid catalyst.

The compositions described herein will include a first polymer and may optionally include one or more additional polymers. A polymer for use in the compositions described herein may, for example, be a thermoplastic, a thermoset, and/or an elastomer. The polymer may be biodegradable, or non-biodegradable. Suitable non-biodegradable thermoplastic polymers may be selected from the group consisting of terpolymers, polyacetals, polyacrylates, cyclic olefin copolymers, elastomers, fluoropolymers, ionomers, polyamides, polybenzimidazoles, polybutene, polycarbonates, polyesters, polyimides, polyketones, polyolefins, polyphenyl ethers, polyphenylene sulfides, polyphenylsulfones, polyphthalamides, polyphthalate carbonates, polystyrenes, polysulfones, polyurethane, polyvinyl dichloride, polysilicones, polysiloxanes, styrene maleic anhydride, polyvinyls, polyethyleneimines, polyquinoxalines, polybenzoxazoles, polyoxadiazoles, polyoxatriazoles, polyacrylamides, polyamide imides, and polyethers, and mixtures thereof. Suitable biodegradable thermoplastic polymers may be selected from the group consisting of biodegradable thermoplastic polymer selected from the group consisting of polyhydroxyalkanoates, polylactides, aliphatic polyesters, aromatic polyesters, polylactones, polyamides, polyanhydrides, polyorthoesters, polyketals, polyester amides, polyvinyl alcohols, polyvinyl acetates, polyhydroxy acids, and polyamino acids, and mixtures thereof.

The first polymer may be present in an amount from about 1 wt % to about 99 wt % of the composition, for example, about 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, or 99 wt %.

The compositions described herein will include a first phenolic compound and may optionally include a second phenolic compound. Exemplary phenolic compounds for use in the omposite described herein include, but are not limited to, (−)-Epicatechin, (−)-Epicatechin 3-O-gallate, (−)-Epicatechin-(2a-7)(4a-8)-epicatechin 3-O-galactoside, (−)-Epigallocatechin, (−)-Epigallocatechin 3-O-gallate, (−)-Epigallocatechin 3'-O-glucuronide, (−)-Epigallocatechin 3-O-glucuronide, (−)-Epigallocatechin 7-O-glucuronide, (+)-Catechin, (+)-Catechin 3-O-gallate, (+)-Catechin 3-O-glucose, (+)-Gallocatechin, (+)-Gallocatechin 3-O-gallate, [6]-Gingerol, 1,2,2'-Triferuloylgentiobiose, 1,2,2'-Trisinapoylgentiobiose, 1,2-Diferuloylgentiobiose, 1,2'-Disinapoyl-2-feruloylgentiobiose, 1,2-Disinapoylgentiobiose, 1,4-Naphtoquinone, 1,5-Dicaffeoylquinic acid, 1,5-Diferuloylquinic acid, 1-Acetoxypinoresinol, 1-Caffeoyl-5-feruloylquinic acid, 1-Feruloyl-5-caffeoylquinic acid, 1-nonyl-4-phenol, 1-Sinapoyl-2,2'-diferuloylgentiobiose, 1-Sinapoyl-2-feruloylgentiobiose, 2,3,6-Trimethylphenol, 2,3-Dihydroxy-1-guaiacylpropanone, 2,3-Dihydroxybenzoic acid, 2,4,6-tri-tert-butylphenol, 2,4-Dihydroxyacetophenone 5-sulfate, 2,4-Dihydroxybenzoic acid, 2,4-dimethyl-6-tert-butylphenol, 2,5-di-S-Glutathionyl caftaric acid, 2,6-Dihydroxybenzoic acid, 2,6-di-tert-butylphenol, 2,6-Xylenol, 2',7-Dihydroxy-4',5'-dimethoxyisoflavone, 24-Methylcholestanol ferulate, 24-Methylcholesterol ferulate, 24-Methylenecholestanol ferulate, 24-Methyllathosterol ferulate, 2-Dehydro-O-desmethylangolensin, 2-Ethyl-4,5-dimethylphenol, 2-Ethylphenol, 2-Hydroxy-2-phenylacetic acid, 2-Hydroxy-4-methoxyacetophenone 5-sulfate, 2-Hydroxybenzoic acid, 2-Hydroxyenterodiol, 2'-Hydroxyenterolactone, 2-Hydroxyenterolactone, 2'-Hydroxyformononetin, 2-Hydroxyhippuric acid, 2-Hydroxyphenylacetic acid, 2-Methoxy-5-prop-1-enylphenol, 2-S-Glutathionyl caftaric acid, 2-tert-Butylphenol, 3-(3,4-Dihydroxyphenyl)-2-methoxypropionic acid, 3',4',5,7-Tetrahydroxyisoflavanone, 3',4',7-Trihydroxyisoflavan, 3',4',7-Trihydroxyisoflavanone, 3,4-DHPEA-AC, 3,4-DHPEA-EA, 3,4-DHPEA-EDA, 3,4-Dicaffeoylquinic acid, 3,4-Diferuloylquinic acid, 3,4-Dihydroxyphenylacetic acid, 3,4-Dihydroxyphenylglycol, 3,4-Dihydroxyphenyllactic acid methyl ester, 3,4-O-Dimethylgallic acid, 3,4-Xylenol, 3,5-Dicaffeoylquinic acid, 3,5-Diferuloylquinic acid, 3,5-Dihydroxybenzoic acid, 3,7-Dimethylquercetin, 3-Caffeoylquinic acid, 3-ethylphenol, 3-Feruloylquinic acid, 3-Hydroxy-3-(3-hydroxyphenyl)propionic acid, 3-Hydroxy-4-methoxyphenyllactic acid, 3-Hydroxybenzoic acid, 3'-Hydroxydaidzein, 3'-Hydroxyequol, 3'-Hydroxygenistein, 3-Hydroxyhippuric acid, 3'-Hydroxymelanettin, 3'-Hydroxy-O-desmethylangolensin, 3-Hydroxyphenylacetic acid, 3-Hydroxyphenylpropionic acid, 3-Hydroxyphenylvaleric acid, 3-Hydroxyphloretin 2'-O-glucoside, 3-Hydroxyphloretin 2'-O-xylosyl-glucoside, 3-Methoxy-4-hydroxyphenyllactic acid, 3-Methoxyacetophenone, 3-Methoxynobiletin, 3-Methoxysinensetin, 3-Methylcatechol, 3'-O-Methyl-(−)-epicatechin 7-O-glucuronide, 3'-O-Methylcatechin, 3'-O-Methylepicatechin, 3'-O-Methylequol, 3-O-Methylgallic acid, 3-O-Methylrosmarinic acid, 3'-O-Methylviolanone, 3-p-Coumaroylquinic acid, 3-Phenylpropionic acid, 3-Sinapoylquinic acid, 4',4"-O-Dimethylepigallocatechin 3-O-gallate, 4,5-Dicaffeoylquinic acid, 4',6,7-Trihydroxyisoflavanone, 4',7-Dihydroxy-3'-methoxyisoflavan, 4',7-Dihydroxy-6-methoxyisoflavan, 4-Caffeoylquinic acid, 4-Erthylphenol, 4-Ethylcatechol, 4-ethylguaiacol, 4-Ethylguaiacol, 4-Ethylphenol, 4-Eruloylquinic acid, 4-Hydroxy-(3',4'-dihydroxyphenyl)valeric acid, 4-Hydroxybenzaldehyde, 4-Hydroxybenzoic acid, 4-Hydroxybenzoic acid 4-O-glucoside, 4-Hydroxycoumarin, 4-Hydroxyenterodiol, 4'-Hydroxyenterolactone, 4-Hydroxyenterolactone, 4-Hydroxyhippuric acid, 4-Hydroxymandelic acid, 4-Hydroxyphenyl-2-propionic acid, 4-Hydroxyphenylacetic acid, 4-Isopropylphenol, 4'-Methoxy-2',3,7-trihydroxyisoflavanone, 4-Methylcatechol, 4'-O-Methyl-(−)-epicatechin 3'-O-glucuronide, 4'-O-Methyl-(−)-epigallocatechin 3'-O-glucuronide, 4'-O-Methyl-(−)-epigallocatechin 7-O-glucuronide, 4'-O-Methylcyanidin 3-O-D-glucoside, 4-O-Methyldelphinidin 3-O-D-glucoside, 4'-O-Methyldelphinidin 3-O-rutinoside, 4'-O-Methylepicatechin, 4'-O-Methylepigallocatechin, 4"-O-Methylepigallocatechin 3-O-gallate, 4'-O-Methylequol, 4-O-Methylgallic acid, 4-p-Coumaroylquinic acid, 4-Sinapoylquinic acid, 4-tert-butylcatechol, 4-tert-butylphenol, 4-Vinylguaiacol, 4-Vinylphenol, 4-Vinylsyringolm 5-(3',4',5'-trihydroxyphenyl)-γ-valerolactone, 5-(3',4',-dihydroxyphenyl)-γ-valerolactone, 5-(3',4'-dihydroxyphenyl)valeric acid, 5-(3',5'-dihydroxyphenyl)-γ-valerolactone, 5-(3',5'-dihydroxyphenyl)-γ-valerolactone 3-O-glucuronide, 5-(3*-Methoxy-4'-hydroxyphenyl)-γ-valerolactone, 5,3',4'-Trihydroxy-3-methoxy-6:7-methylenedioxyflavone 4'-O-glucuronide, 5,4'-Dihydroxy-3,3'-dimethoxy-6:7-methylenedioxyflavone 4'-O-glucuronide, 5,6,7,3',4'-Pentahydroxyisoflavone, 5,6,7,4'-Tetrahydroxyisoflavone, 5,6-Dihydroxy-7,8,3',4'-tetramethoxyflavone, 5,7,8,3',4'-Pentahydroxyisoflavone, 5,7,8,4'-Tetrahydroxyisoflavone, 5,7-Dihydroxy-8,4'-dimethoxyisoflavone, 5-5'-Dehydrodiferulic acid, 5-8'-Benzofuran dehydrodiferulic acid, 5-8'-Dehydrodiferulic acid, 5-Caffeoylquinic acid, 5-Feruloylquinic acid, 5-Heneicosenylresorcinol, 5-Heneicosylresorcinol, 5-Heptadecylresorcinol, 5-Hydroxyenterolactone, 5'-Hydroxy-O-desmethylangolensin, 5'-Methoxy-O-desmethylangolensin, 5-Nonadecenylresorcinol, 5-Nonadecylresorcinol, 5-O-Galloylquinic acid, 5-p-Coumaroylquinic acid, 5-Pentacosenylresorcinol, 5-Pentacosylresorcinol, 5-Pentadecylresorcinol, 5-Sinapoylquinic acid, 5-Tricosenylresorcinol, 5-Tricosylresorcinol, 6,7,3',4'-Tetrahydroxyisoflavone, 6,7,4'-Trihydroxyisoflavone, 6,8-Dihydroxykaempferol, 6-Geranylnaringenin, 6'-Hydroxyangolensin, 6-Hydroxydihydrodaidzein, 6-Hydroxyenterodiol, 6'-Hydroxyenterolactone, 6-Hydroxyenterolactone, 6-Hydroxyluteolin, 6-Hydroxyluteolin 7-O-rhamnoside, 6'-Hydroxy-O-desmethylangolensin, 6"-O-Acetyldaidzin, 6"-O-Acetylgenistin, 6"-O-Acetylglycitin, 6"-O-Malonyldaidzin, 6"-O-Malonylgenistin, 6"-O-Malonylglycitin, 6-O-Methylequol, 6-Prenylnaringenin, 7,3',4'-Trihydroxyflavone, 7,4'-Dihydroxyflavone, 7,8,3',4'-Tetrahydroxyisoflavone, 7,8,4'-Trihydroxyisoflavone, 7-Hydroxyenterolactone, 7-Hydroxymatairesinol, 7-Hydroxysecoisolariciresinol, 7-Oxomatairesinol, 8-Hydroxydihydrodaidzein, 8-O-4'-Dehydrodiferulic acid, 8-Prenylnaringenin, Acetyl eugenol, Angolensin, Anhydro-secoisolariciresinol, Anylmetacresol, Apigenin, Apigenin 6,8-C-arabinoside-C-glucoside, Apigenin 6,8-C-galactoside-C-arabinoside, Apigenin 6,8-di-C-glucoside, Apigenin 6-C-glucoside, Apigenin 7-O-(6"-malonyl-apiosyl-glucoside), Apigenin 7-O-apiosyl-glucoside, Apigenin 7-O-diglucuronide, Apigenin 7-O-glucoside, Apigenin 7-O-glucuronide, Arbutin, Arctigenin, Avenanthramide 2c, Avenanthramide 2f, Avenanthramide 2p, Avenanthramide K, Baicalein, Biochanin A, Bisdemethoxycurcumin, Butein, Butin, Butylated hydroxyanisole, Butylated hydroxytoluene, Caffeic acid, Caffeic acid 3-O-glucuronide, Caffeic acid 3-sulfate, Caffeic acid 4-O-glucoside, Caffeic acid 4-O-glucuronide, Caffeic acid 4-sulfate, Caffeic acid ethyl ester, Caffeoyl aspartic acid, Caffeoyl C1-glucuronide, Caffeoyl glucose, Caffeoyl tartaric acid, Calycosin, Carnosic acid, Carnosol, Carvacrol, Carvacrol, Catechol, Chicoric acid, Chrysin, Chrysoeriol 7-O-(6"-malonyl-apiosyl-glucoside), Chrysoeriol 7-O-(6"-malonyl-glucoside), Chrysoeriol 7-O-apiosyl-glucoside, Chrysoeriol 7-O-glucoside, Cinnamic acid, Cinnamoyl glucose, Cinnamtannin A2, Cirsilineol. Cirsimaritin. cis-4-Hydroxyequol, Conidendrin, Coumarin, Coumestrol, Cresol, Curcumin, Cyanidin, Cyanidin 3,5-O-diglucoside, Cyanidin 3-O-(2-O-(6-O-(E)-caffeoyl-D glucoside)-D-glucoside)-5-O-D-glucoside, Cyanidin 3-O-(3",6"-O-dimalonyl-glucoside), Cyanidin 3-O-(6"-acetyl-galactoside), Cyanidin 3-O-(6"-acetyl-glucoside), Cyanidin 3-O-(6"-caffeoylglucoside), Cyanidin 3-O-(6"-dioxalyl-glucoside), Cyanidin 3-O-(6"-malonyl-3"-glucosyl-glucoside), Cyanidin 3-O-(6"-malonyl-glucoside), Cyanidin 3-O-(6"-p-coumaroyl-glucoside), Cyanidin 3-O-(6"-succinyl-glucoside), Cyanidin 3-O-arabinoside, Cyanidin 3-O-diglucoside-5-O-glucoside, Cyanidin 3-O-galactoside, Cyanidin 3-O-glucoside, Cyanidin 3-O-glucosyl-rutinoside, Cyanidin 3-O-rutinoside, Cyanidin 3-O-sambubioside, Cyanidin 3-O-sambubioside 5-O-glucoside, Cyanidin 3-O-sophoroside, Cyanidin 3-O-xyloside, Cyanidin 3-O-xylosyl-rutinoside, Cyclolariciresinol, Daidzein, Daidzein 4'-O-glucuronide, Daidzein 7-O-glucuronide, Daidzin, Daidzin 4'-O-glucuronide, Dalbergin, Danshensu, Delphinidin 3,5-O-diglucoside, Delphinidin 3-O-(6"-acetyl-galactoside), Delphinidin 3-O-(6"-acetyl-glucoside), Delphinidin 3-O-(6"-p-coumaroyl-glucoside), Delphinidin 3-O-arabinoside, Delphinidin 3-O-feruloyl-glucoside, Delphinidin 3-O-galactoside, Delphinidin 3-O-glucoside, Delphinidin 3-O-glucosyl-glucoside, Delphinidin 3-O-rutinoside, Delphinidin 3-O-sambubioside, Delphinidin 3-O-xyloside, Demethoxycurcumin, Demethyloleuropein, Deoxyschisandrin, Didymin, Dihydrobiochanin A, Dihydrocaffeic acid, Dihydrocaffeic acid 3-O-glucuronide, Dihydrocaffeic acid 3-sulfate, Dihydrodaidzein, Dihydrodaidzein 7-O-glucuronide, Dihydroferulic acid, Dihydroferulic acid 4-O-glucuronide, Dihydroferulic acid 4-sulfate, Dihydroferuloylglycine, Dihydroformononetin, Dihydrogenistein, Dihydroglycitein, Dihydromyricetin 3-O-rhamnoside, Dihydro-p-coumaric acid, Dihydroquercetin, Dihydroquercetin 3-O-rhamnoside, Dihydrosinapic acid, Dimethylmatairesinol, Diosmin, Ellagic acid, Ellagic acid acetyl-arabinoside, Ellagic acid acetyl-xyloside, Ellagic acid arabinoside, Ellagic acid glucoside, Enterodiol, Enterolactone, Epicatechin 3'-O-glucuronide, Epicatechin 7-O-glucuronide, Epigallocatechin 3-O-gallate-7-O-glucoside-4"-O-glucuronide, Epirosmanol, Episesamin, Episesaminol, Equol, Equol 4'-O-glucuronide, Equol 7-O-glucuronide, Eriocitrin, Eriodictyol, Eriodictyol 7-O-glucoside, Esculetin, Esculin, Ethyl gallate, Eugenol, Eugenol, Eupatorin, Feruladehyde, Ferulic acid, Ferulic acid 4-O-glucoside, Ferulic acid 4-O-glucuronide, Ferulic acid 4-sulfate, Feruloyl Cl-glucuronide, Feruloyl glucose, Feruloyl tartaric acid, Feruloylglycine, Formononetin, Formononetin 7-O-glucuronide, Galangin, Gallagic acid, Gallic acid, Gallic acid 3-O-gallate, Gallic acid 4-O-glucoside, Gallic acid ethyl ester, Gallic aldehyde, Galloyl glucose, Gardenin B, Genistein, Genistein 4',7-O-diglucuronide, Genistein 4'-O-glucuronide, Genistein 5-O-glucuronide, Genistein 7-O-glucuronide, Genistin, Gentisic acid, Geraldone, Glycitein, Glycitein 4'-O-glucuronide, Glycitein 7-O-glucuronide, Glycitin, Gomisin D, Gomisin M2, Guaiacol, Hesperetin, Hesperetin 3',7-O-diglucuronide, Hesperetin 3'-O-glucuronide, Hesperetin 3'-sulfate, Hesperetin 5,7-O-diglucuronide, Hesperetin 7-O-glucuronide, Hesperidin, Hippuric acid, Hispidulin, Homoeriodictyol, Homovanillic acid, Homovanillic acid 4-sulfate, Homoveratric acid, Hydroquinone, Hydroxycaffeic acid, Hydroxydanshensu, Hydroxytyrosol, Hydroxytyrosol 4-O-glucoside, Irilone, Irisolidone, Irisolidone 7-O-glucuronide, Isoferulic acid, Isoferulic acid 3-O-glucuronide, Isoferulic acid 3-sulfate, Isoferuloyl Cl-glucuronide, Isohydroxymatairesinol, Isolariciresinol, Isoliquiritigenin, Isopeonidin 3-O-arabinoside, Isopeonidin 3-O-galactoside, Isopeonidin 3-O-glucoside, Isopeonidin 3-O-rutinoside, Isopeonidin 3-O-sambubioside, Isopeonidin 3-O-xyloside, Isopimpinellin, Isopropyl 3-(3,4-dihydroxyphenyl)-2-hydroxypropanoate, Isorhamnetin, Isorhamnetin 3-O-galactoside, Isorhamnetin 3-O-glucoside, Isorhamnetin 3-O-glucoside 7-O-rhamnoside, Isorhamnetin 3-O-glucuronide, Isorhamnetin 3-O-rutinoside, Isorhamnetin 4'-O-glucoside, Isorhamnetin 4'-O-glucuronide, Isorhamnetin 7-O-rhamnoside, Isorhoifolin, Isosakuranetin, Isotectorigenin, Isoxanthohumol, Jaceidin 4'-O-glucuronide, Jaceosidin, Juglone, Kaempferide, Kaempferol, Kaempferol 3,7,4'-O-triglucoside, Kaempferol 3,7-O-diglucoside, Kaempferol 3-O-(2"-rhamnosyl-6"-acetyl-galactoside) 7-O-rhamnoside, Kaempferol 3-O-(2"-rhamnosyl-galactoside) 7-O-rhamnoside, Kaempferol 3-O-(6"-malonyl-glucoside), Kaempferol 3-O-(6"-acetyl-galactoside) 7-O-rhamnoside, Kaempferol 3-O-acetyl-glucoside, Kaempferol 3-O-galactoside, Kaempferol 3-O-galactoside 7-O-rhamnoside, Kaempferol 3-O-glucoside, Kaempferol 3-O-glucosyl-rhamnosyl-galactoside, Kaempferol 3-O-glucosyl-rhamnosyl-glucoside, Kaempferol 3-O-glucuronide, Kaempferol 3-O-rhamnoside, Kaempferol 3-O-rhamnosyl-rhamnosyl-glucoside, Kaempferol 3-O-rutinoside, Kaempferol 3-O-sophoroside, Kaempferol 3-O-sophoroside 7-O-glucoside, Kaempferol 3-O-xylosyl-glucoside, Kaempferol 3-O-xylosyl-rutinoside, Kaempferol 7-O-glucoside, Koparin, Lambertianin C, Lariciresinol, Lariciresinol-sesquilignan, Lauryl gallate, Ligstroside, Ligstroside-aglycone, Lithospermic acid, Luteolin, Luteolin 6-C-glucoside, Luteolin 7-O-(2-apiosyl-6-malonyl)-glucoside, Luteolin 7-O-(2-apiosyl-glucoside), Luteolin 7-O-diglucuronide, Luteolin 7-O-glucoside, Luteolin 7-O-glucuronide, Luteolin 7-O-malonyl-glucoside, Luteolin 7-O-rutinoside, Malvidin 3,5-O-diglucoside, Malvidin 3-O-(6"-acetyl-galactoside), Malvidin 3-O-(6"-acetyl-glucoside), Malvidin 3-O-(6"-caffeoyl-glucoside), Malvidin 3-O-(6"-p-coumaroyl-glucoside), Malvidin 3-O-arabinoside, Malvidin 3-O-galactoside, Malvidin 3-O-glucoside, Matairesinol, m-Coumaric acid, Medioresinol, Melanettin, Mellein, Mesitol, Methoxyphenylacetic acid, methyl gallate, Methylgalangin, Morin, Myricetin, Myricetin 3-O-arabinoside, Myricetin 3-O-galactoside, Myricetin 3-O-glucoside, Myricetin 3-O-rhamnoside, Myricetin 3-O-rutinoside, Naringenin, Naringenin 4'-O-glucuronide, Naringenin 5-O-glucuronide, Naringenin 7-O-glucoside, Naringenin 7-O-glucuronide, Naringin, Naringin 4'-O-glucoside, Naringin 6'-malonate, Narirutin, Narirutin 4'-O-glucoside, Neodiosmin, Neoeriocitrin, Neohesperidin, Nepetin, Nobiletin, Nonylphenol, Norathyriol, Nortrachelogenin, o-Coumaric acid, O-Desmethylangolensin, Oleoside 11-methylester, Oleoside dimethylester, Oleuropein, Oleuropein-aglycone, Orobol, Paeoniflorin, Paeonol, p-Anisaldehyde, Patuletin 3-O-(2"-feruloylglucosyl)(1→6)[apiosyl(1→2)]-glucoside, Patuletin 3-O-glucosyl-(1→6)[apiosyl(1→2)]-glucoside, p-Coumaric acid, p-Coumaric acid 4-O-glucoside, p-Coumaric acid ethyl ester, p-Coumaroyl glucose, p-Coumaroyl glycolic acid, p-Coumaroyl malic acid, p-Coumaroyl tartaric acid, p-Coumaroyl tartaric acid glucosidic ester, p-Coumaroyl tyrosine, p-Coumaroylquinic acid, Pebrellin, Pelargonidin, Pelargonidin 3,5-O-diglucoside, Pelargonidin 3-O-(6"-malonyl-glucoside), Pelargonidin 3-O-(6"-succinyl-glucoside), Pelargonidin 3-O-arabinoside, Pelargonidin 3-O-galactoside, Pelargonidin 3-O-glucoside, Pelargonidin 3-O-glucosyl-rutinoside, Pelargonidin 3-O-rutinoside, Pelargonidin 3-O-sambubioside, Pelargonidin 3-O-sophoroside, Peonidin, Peonidin 3-O-(2-O-(6-O-(E)-caffeoyl-D-glucosyl)-D-glucoside)-5-O-D-glucoside, Peonidin 3-O-(6"-acetyl-galactoside), Peonidin 3-O-(6"-acetyl-glucoside), Peonidin 3-O-(6"-p-coumaroyl-glucoside), Peonidin 3-O-arabinoside, Peonidin 3-O-diglucoside-5-O-glucoside, Peonidin 3-O-galactoside, Peonidin 3-O-glucoside, Peonidin 3-O-rutinoside, Peonidin 3-O-sambubioside, Peonidin 3-O-sambubioside-5-O-glucoside, Peonidin 3-O-sophoroside, Peonidin 3-O-xyloside, Petunidin 3,5-O-diglucoside, Petunidin 3-O-(6"-acetyl-galactoside), Petunidin 3-O-(6"-acetyl-glucoside), Petunidin 3-O-(6"-p-coumaroyl-glucoside), Petunidin 3-O-arabinoside, Petunidin 3-O-galactoside, Petunidin 3-O-glucoside, Petunidin 3-O-rhamnoside, Petunidin 3-O-rutinoside, Phenacetylglycine, Phenol, Phenylacetic acid, Phloretin, Phloretin 2'-O-glucuronide, Phloretin 2'-O-xylosyl-glucoside, Phloridzin, Phlorin, p-HPEA-AC, p-HPEA-EA, p-HPEA-EDA, Pigment A, Pinocembrin, Pinoresinol, Pinotin A, Ponci016, Procyanidin dimer B1, Procyanidin dimer B2, Procyanidin dimer B3, Procyanidin dimer B4, Procyanidin dimer B5, Procyanidin dimer B7, Procyanidin trimer C1, Procyanidin trimer C2, Procyanidin trimer EEC, Procyanidin trimer T2, Prodelphinidin dimer B3, Prodelphinidin trimer C-GC-C, Prodelphinidin trimer GC-C-C, Prodelphinidin trimer GC-GC-C, Propyl gallate, Protocatechuic acid, Protocatechuic acid 4-O-glucoside, Propyl gallate, Protocatechuic aldehyde, Prunetin, Pseudobaptigenin, Puerarin, Punicalagin, Punicalin, Pyrocatechol, Pyrogallol, Quercetin, Quercetin 3,4'-O-diglucoside, Quercetin 3-O-(6"-malonyl-glucoside), Quercetin 3-O-(6"-malonyl-glucoside) 7-O-glucoside, Quercetin 3-O-(6"-acetyl-galactoside) 7-O-rhamnoside, Quercetin 3-O-acetyl-rhamnoside, Quercetin 3-O-arabinoside, Quercetin 3-O-galactoside, Quercetin 3-O-galactoside 7-O-rhamnoside, Quercetin 3-O-glucoside, Quercetin 3-O-glucosyl-rhamnosyl-galactoside, Quercetin 3-O-glucosyl-rhamnosyl-glucoside, Quercetin 3-O-glucosyl-xyloside, Quercetin 3'-O-glucuronide, Quercetin 3-O-glucuronide, Quercetin 3-O-rhamnoside, Quercetin 3-O-rhamnosyl-galactoside, Quercetin 3-O-rhamnosyl-rhamnosyl-glucoside, Quercetin 3-O-rutinoside, Quercetin 3-O-sophoroside, Quercetin 3-O-xyloside, Quercetin 3-O-xylosyl-glucuronide, Quercetin 3-O-xylosyl-rutinoside, Quercetin 3'-sulfate, Quercetin 4'-O-glucoside, Quercetin 4'-O-glucuronide, Quercetin 7,4'-O-diglucoside, Resacetophenone, Resorcinol, Rhamnetin, Rhoifolin, Rhoifolin 4'-O-glucoside, Rosmadial, Rosmanol, Rosmarinic acid, Sakuranetin, Salicylic acid, Salvianolic acid B, Salvianolic acid C, Salvianolic acid D, Salvianolic acid G, Sanguiin H-6, Sativanone, Schisandrin, Schisandrin B, Schisandrin C, Schisandrol B, Schisanhenol, Schisantherin A, Schottenol ferulate, Scopoletin, Scutellarein, Secoisolariciresinol, Secoisolariciresinol-sesquilignan, Sesaminol, Sesaminol 2-O-triglucoside, Sesamol, Sesamolinol, Sinapaldehyde, Sinapic acid, Sinapine, Sinensetin, Sitosterol ferulate, Spinacetin 3-O-(2"-feruloylglucosyl)(1→6)-[apiosyl(1→2)]-glucoside, Spinacetin 3-O-(2"-p-coumaroylglucosyl)(1→6)-[apiosyl(1→2)]-glucoside, Spinacetin 3-O-glucosyl-(1→6)-[apiosyl(1→2)]-glucoside, Spinacetin 3-O-glucosyl-(1→6)-glucoside, stearyl gallate, Stevenin, Stigmastanol ferulate, Syringaldehyde, Syringaldehyde, Syringaresinol, Syringic acid, Tangeretin, Tectoridin, Tectorigenin, Tectorigenin 4'-sulfate, Tectorigenin 7-sulfate, Tert-butylhydroquinone, Tetramethylscutellarein, Theaflavin, Theaflavin 3,3'-O-digallate, Theaflavin 3'-O-gallate, Theaflavin 3-O-gallate, Thymol, Tigloylgomicin H, Todolactol A, Trachelogenin, Tyrosol, Tyrosol 4-sulfate, Umbelliferone, Urolithin A, Urolithin A 3,8-O-diglucuronide, Urolithin B, Urolithin B 3-O-glucuronide, Urolithin C, Valoneic acid dilactone, Vanillic acid, Vanillic acid 4-sulfate, Vanillin, Vanillin 4-sulfate, Verbascoside, Vestitone, Violanone, Vitisin A, Xanthohumol, Xanthotoxin, Xylenol, and mixtures thereof.

The first phenolic compound may be present in an amount from about 0.1 to about 15 wt % of the composition, for example, about 0.1, 0.2, 0.3, 0.4, 0.5, 0.6, 0.7, 0.8, 0.9, 1.0, 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, 3.0, 3.1, 3.2, 3.3, 3.4, 3.5, 3.6, 3.7, 3.8, 3.9, 4.0, 4.1, 4.2, 4.3, 4.4, 4.5, 4.6, 4.7, 4.8, 4.9, 5.0, 5.1, 5.2, 5.3, 5.4, 5.5, 5.6, 5.7, 5.8, 5.9, 6.0, 6.1, 6.2, 6.3, 6.4, 6.5, 6.6, 6.7, 6.8, 6.9, 7.0, 7.1, 7.2, 7.3, 7.4, 7.5, 7.6, 7.7, 7.8, 7.9, 8.0, 8.1, 8.2, 8.3, 8.4, 8.5, 8.6, 8.7, 8.8, 8.9, 9.0, 9.1, 9.2, 9.3, 9.4, 9.5, 9.6, 9.7, 9.8, 9.9, 10.0, 10.1, 10.2, 10.3, 10.4, 10.5, 10.6, 10.7, 10.8, 10.9, 11.0, 11.1, 11.2, 11.3, 11.4, 11.5, 11.6, 11.7, 11.8, 11.9, 12.0, 12.1, 12.2, 12.3, 12.4, 12.5, 12.6, 12.7, 12.8, 12.9, 13.0, 13.1, 13.2, 13.3, 13.4, 13.5, 13.6, 13.7, 13.8, 13.9, 14.0, 14.1, 14.2, 14.3, 14.4, 14.5, 14.6, 14.7, 14.8, 14.9, or 15.0 wt %.

As used herein, the term "alcohol" encompasses simple alcohols, diols, triols, and polyols. Suitable alcohols for use in the composite described herein may include, but are not limited to, glycerol, dodecanol, benzyl alcohol, hexanediol, hexanetriol, pentaerythritol, dipentaerythritol, tripentaerythritol, erythritol, xylitol, sorbitol, mannitol, triglycerol, propylene glycol, ethylene glycol, polyethylene glycol, butanediol, ethanediol, propanediol, terpinene-1-ol, trimethylolethane, glucitol diacetate, and mixtures thereof.

The alcohol may be present in an amount up to about 40 wt % of the composition, for example, about 0, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, or 40 wt %.

The compositions described herein will include a first Lewis acid catalyst and may optionally include a second Lewis acid catalyst. Suitable Lewis acid catalysts for use in the composites described herein may include, but are not limited to, transition metal complexes, metal (and metalloid) oxides, metallic nanoparticles, and main-group Lewis acids. Exemplary transition metal complexes include, but are not limited to, iron (II) acetate, iron (III) acetate, iron (0) pentacarbonyl, iron (II) fumarate, iron (III) phosphate, iron (II) gluconate, copper (I) iodide, copper (II) iodide, copper (I) acetate, copper (II) acetate, copper (II) gluconate, copper (II) phosphate, copper (II) acetylacetonate, dichlorozirconocene, dimethylzirconocene, zirconium (IV) ethoxide. Exemplary metal (and metalloid) oxides may include, but are not limited to, iron (II) oxide, iron (III) oxide, titanium oxide, zirconium oxide, boron oxide (borate), and/or aluminum oxide. Exemplary metallic nanoparticles may include, but are not limited to, as iron nanoparticles, ruthenium nanoparticles, and/or gold nanoparticles. Exemplary main-group Lewis acids may include, but are not limited to, tris(perfluorophenyl)borane, triphenylborane, trimethylborate, boron trichloride, and aluminium trichloride.

The first Lewis acid catalyst may be present in an amount of about 0.001 wt % to about 5 wt % of the composite, for example about 0.001, 0.002, 0.003, ... 0.100, 0.101, 0.102, 0.103, ... 0.200, 0.201, 0.202, 0.203, ... 0.300, 0.301, 0.302, 0.303, ... 0.400, 0.401, 0.402, 0.403, ... 0.500, 0.501, 0.502, 0.503, ... 0.600, 0.601, 0.602, 0.603, ... 0.700, 0.701, 0.702, 0.703, ... 0.800, 0.801, 0.802, 0.803, ... 0.900, 0.901, 0.902, 0.903, ... 1.000%, 1.001, 0.002, 1.003, ... 1.100, 1.101, 1.102, 1.103, ... 1.200, 1.201, 1.202, 1.203, ... 1.300, 1.301, 1.302, 1.303, ... 1.400, 1.401, 1.402, 1.403, ... 1.500, 1.501, 1.502, 1.503, ... 1.600, 1.601, 1.602, 1.603, ... 1.700, 1.701, 1.702, 1.703, ... 1.800, 1.801, 1.802, 1.803, ... 1.900, 1.901, 1.902, 1.903, ... 2.000, 2.001, 2.002, 2.003, ... 2.100, 2.101, 2.102, 2.103, ... 2.200, 2.201, 2.202, 2.203, ... 2.300, 2.301, 2.302, 2.303, ... 2.400, 2.401, 2.402, 2.403, ... 2.500, 2.501, 2.502, 2.503, ... 2.600, 2.601, 2.602, 2.603, ... 2.700, 2.701, 2.702, 2.703, ... 2.800, 2.801, 2.802, 2.803, ... 2.900, 2.901, 2.902, 2.903, ... 3.000, 3.001, 3.002, 3.003, ... 3.100, 3.101, 3.102, 3.103, ... 3.200, 3.201, 3.202, 3.203, ... 3.300, 3.301, 3.302, 3.303, . . . 3.400, 3.401, 3.402, 3.403, . . . 3.500, 3.501, 3.502, 3.503, . . . 3.600, 3.601, 3.602, 3.603, . . . 3.700, 3.701, 3.702, 3.703, . . . 3.800, 3.801, 3.802, 3.803, . . . 3.900, 3.901, 3.902, 3.903, . . . 4.000, 4.001, 4.002, 4.003, . . . 4.100, 4.101, 4.102, 4.103, . . . 4.200, 4.201, 4.202, 4.203, . . . 4.300, 4.301, 4.302, 4.303, . . . 4.400, 4.401, 4.402, 4.403, . . . 4.500, 4.501, 4.502, 4.503, . . . 4.600, 4.601, 4.602, 4.603, . . . 4.700, 4.701, 4.702, 4.703, . . . 4.800, 4.801, 4.802, 4.803, . . . 4.900, 4.901, 4.902, 4.903, . . . or 5.000 wt %.

In an exemplary embodiment, the biodegradable polymer composite described herein comprises
- about 44.945 wt % of a first polymer;
- about 30 wt % of a second polymer;
- about 20 wt % of a plasticizer;
- about 5 wt % of a phenol;
- about 0.05 wt % of a Lewis acid catalyst; and
- about 0.5 wt % an oxidant.

The composition described herein may also include one or more fillers. The filler(s) chosen for inclusion in the composition can affect the characteristics of the composition; however, even inert fillers can be advantageous as they decrease the cost of the composition. Exemplary fillers for use in the composition described herein include, but are not limited to, carbon black, aluminum nitride, aluminum oxide, calcium carbonate, calcium fluoride, calcium silicate, cellulose, chitosan, clay, nanoclay, hollow glass spheres, hydroxyethylcellulose, glass spheres, graphene, carbon nanotubes, kaolin, molybdenum disulfide, silica, nutshell powder, silicon carbide, silicon nitride, titanium dioxide, wollastonite, wood flour, zeolites, zinc oxide, aramid fibers, carbon fibers, glass fibers, and mixtures thereof.

Different fillers may confer different properties to the biodegradable polymer blend. The filler may be selected by the skilled artisan based on the desired properties of the final product. For example, Table 1 lists different suitable fillers and the properties which they confer/modify.

TABLE 1

| Filler | Function/improvement |
| --- | --- |
| Carbon Black | tensile/heat transfer/colorant/bloom reduction agent |
| Aluminum nitride | heat transfer |
| aluminum oxide | nucleation/hardness/filler compatibilizer |
| calcium carbonate | cost/hardness/compression |
| calcium fluoride | nucleation |
| calcium silicate | hydrophilic filler for starch matrix/oil absorption |
| Cellulose | biodegradable strength filler |
| Chitosan | biodegradable strength filler |
| Clay | cost/compression |
| Nanoclay | cost/compression/tensile |
| hollow glass spheres | sacrificial plastic deformation/lightweight-high volume |
| glass spheres | cut and puncture resistance |
| graphene | tensile/water oxygen perm reducer/conductivity |
| carbon nanotubes | tensile/heat transfer/fiber alignment |
| Kaolin | cost/compression/ |
| molybdenum disulfide | fiber alignment/shear aid |
| Silica | cost/hardness/compression/tensile |
| nutshell powder | cost/biodegradable |
| silicon carbide | nucleation/hardness/tensile |
| silicon nitride | decrease thermal expansion/hardness/thermal |
| titanium dioxide | hardness/compression/colorant |
| wollastonite | fiber alignment/anti tear/ tensile |
| wood flour | biodegradable strength filler |
| zeolites | odor absorbent/nucleation agent |
| zinc oxide | fungal inhibitor/crosslinker/compression |
| aramid fibers | strength/cut resistance |
| carbon fibers | tensile/conductivity/cut resistance |
| glass fibers | tensile/cut resistance |

Fillers for use in the composition as described herein may be present in an amount of up to about 30 to about 95 wt % of the composition, for example up to about 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, or 95 wt % of the composition. Some fillers, such as graphene, can be extremely potent and are useful in amounts as low as 0.01%.

In addition to, or as a substitute for, the fillers described above, the composition described herein may contain one or more agrowaste/green fillers, wherein the one or more agrowaste/green fillers are present in an amount of about 1% up to about 80% by weight of the composition, for example up to about 5, 10, 15, 20, 25, 30, 35, 40, 45, 50, 55, 60, 65, 70, 75, or 80 wt %. Including agrowaste/green fillers has several advantages, including decreasing the cost of the composition compared to the composite alone. The filler may also impart desirable properties to the product. Suitable agrowaste/green fillers which may be used in the composition described herein may include, but are not limited to, pineapple pulp, corn husk, silk waste, waste hemp, lignin, cranberry hull, nut shell waste generic, palm kernel shell, coconut, palm pulp, coffee berry pulp, ground corn cob, apple waste, chitin, ramie fibers, rattan fibers, vine fiber, jute fibers, kenaf fibers, flax fibers, fibroin, wool, cotton, wood flour, coarse sawdust, spent coffee grounds, processed vegetable waste, almond hull, almond husk, walnut shell, sugar cane base, and mixtures thereof.

The compositions described herein may also include one or more plasticizers. Suitable compounds for use as plasticizers in the compositions described herein may include aliphatic or aromatic amides or poly/oligo amines and amides; citrates; glycerides; glycols and poly/oligo ethers; poly/oligo lactides; sorbitan esters and poly/oligo sorbates; adipates, sebacates, succinates, azelates, and acetates; epoxidized vegetable oils and vegetable oils; and/or phthalates.

Exemplary aliphatic or aromatic or poly/oligo amines and amides for use as the plasticizer in the composite described herein may include, but are not limited to, stearamide, urea, methyl picolinate, ethanolamine, diethanolamine, triethanolamine, urea, betaine, taurine, histidine, tyramine, proline, glutamine, and mixtures thereof.

Exemplary citrates for use as the plasticizer in the composite described herein may include, but are not limited to, triethyl citrate, acetyl tributyl citrate, tributyl citrate, trihexyl citrate, butyryl trihexyl citrate, acetyl trihexyl citrate, butyl trihexyl citrate, tristearyl citrate, trioctyl citrate, acetyl capryl citrate, acetyl trioctyl citrate, and mixtures thereof.

Exemplary glycerides for use as the plasticizer in the composite described herein may include, but are not limited to, glycerol triacetate, glycerol diacetate, glycerol monoacetate, glycerol monooleate glycerol tributyrate, glycerol dibutanoate, vegetable oils, castor oil, glycerol dipropionate, glycerol tripropionate, glycerol monobutanoate, glycerol monostearate, glycerol distearate, glycerol laurate, glycerol tristearate, glycerol trioleate, glycerol lactate, glycerol carbonate acetate, glycerol carbonate ethyl ether, decaglycerol tetraoleate, and mixtures thereof.

Exemplary glycols and poly/oligo ethers for use as the plasticizer in the composite described herein may include, but are not limited to, PEG, propylene glycol, ethylene glycol, triethylene glycol diacetate, triethylene glycol dicaprylate, and mixtures thereof.

Exemplary poly/oligo esters and aliphatic esters for use as the plasticizer in the composite described herein may include polycaprolactone (PCL), PCL oligomers, PCL diols, PCL triols, PCL tetraols, dendritic PCL, ethyl lactate, methyl lactate, ethyl octanoate, lauryl acetate, lauroyl acetate, pentaerythritol tetraacetate, and mixtures thereof.

Exemplary poly/oligo lactides for use as the plasticizer in the composite described herein may include, but are not limited to, polylactic acid (PLA), PLA oligomers, PLA oliogmers ethyl terminated, and mixtures thereof.

Exemplary sorbitan esters and poly/oligo sorbates for use as the plasticizer in the compo site described herein may include, but are not limited to, TWEEN® and SPAN™, and mixtures thereof.

Exemplary adipates, sebacates, succinates, azelates, and acetates for use as the plasticizer in the composite described herein may include, but are not limited to, dioctyl adipate, dibutoxy sebacate, di-n-butyl sebacate, diisocotyl adipate, diisodecyl adipate, dioctyl sebacate, didodecyl sebacate, diethyl succinate, diethyl adipate, di-n-butyl azelate, di-isooctyl azelate, methyl azelate, diisobutyl adipate, di(2-hexyldecyl) adipate, dibutyl succinate, and mixtures thereof.

Exemplary epoxidized vegetable oils and vegetable oils for use as the plasticizer in the composite described herein may include, but are not limited to, epoxidized soybean oil, epoxidized castor oil, epoxidized linseed oil, epoxidized tall oil, cottonseed oil, castor oil, soybean oil, linseed oil, peanut oil, sunflower oil, grapeseed oil, canola oil, olive oil, corn oil, and mixtures thereof.

Exemplary phthalates for use as the plasticizer in the composite described herein may include, but are not limited to, dioctyl phthalate, di-(2-ethylhexyl) phthalate, diisononyl phthalate, diisodecyl phthalate, diisoheptyl phthalate, diisobutyl phthalate, ditridecyl phthalate, butyl benzyl phthalate, dihexyl phthalate, and mixtures thereof.

The second polymer may be present in amount from about 1 wt % to about 50 wt % of the composition, for example, about 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50 wt %.

The composite may optionally comprise a co-resin.

In an alternative embodiment, the ingredients for use in producing the thermoplastic composite described herein may also comprise a co-resin, an alcohol, a catalyst, and/or an oxidant. The alcohol may be present in an amount up to about 40 wt % of the composite, for example about 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, or about 40 wt %. The oxidant may be added in an amount of about 0.1 to about 2 wt % of the composite, for example, about 0.1, 0.2, 0.3, 0.4, 0.5, 0.6, 0.7, 0.8, 0.9, 1.0, 1.1, 1.2, 1.3, 1.4, 1.5, 1.6, 1.7, 1.8, 1.9, or about 2.0 wt %.

The composition described herein may be subjected to strain hardening. The inventors have surprisingly discovered that subjecting the composite to mechanical strain results in increased tensile strength of the material. Strain hardening may be accomplished by "prestraining," i.e., stretching the composition material uniaxially or biaxially.

Certain embodiments of the composites described herein exhibit a strain hardening effect that allows the material to strengthen after a strain-relaxation cycle; this also allows strength/elongation tuning of the material in very predicable ways (FIG. 1). Such strain hardening can result in increases in tensile strength of six times or more. Formulations have been as strong as 200 MPa out of material that has semi-elastomeric behavior. In addition, the strength gain is proportional to the amount of elongation yielded during a strain cycle—this shows a predictable and calculable strength/elongation/toughness relationship equal to the total amount of energy introduced to the material. This strain hardening mechanism does not appear to have a significant strain/shear rate dependance. The material exhibits rubber-like deformation behavior where energy is diffused readily through the material with a more diffuse neck (more uniform deformation) as opposed to focusing at its weakest point creating a sharp neck.

Certain embodiments of the composites described herein exhibit increased efficiency in material property improvements from a functional filler at a given loading. In example 4, samples were produced with milled carbon fiber loadings at 20 wt % in both an enhanced base resin and a control base resin. The resulting enhanced composite saw gains in tensile strength, tensile modulus, flexural strength and flexural modulus. The increase in efficiency of a filler at a given loading has commercial implications for making stronger composites at certain density or by reducing costly filler loadings while meeting an equal material specification.

Certain embodiments of the composites described herein exhibit a strong increase in the impact strength and overall toughness. The impact strength improvements are demonstrated in examples 3, 4, 9, and 10. It is shown that relatively low loadings of the described technology can improve impact strength by 36-fold relative to the control polymer. The overall toughness improvement of composites described herein is demonstrated in examples 3, 4, 5, 6, 7, 9, and 10. One particularly notable example of material toughness improvement is found in example 3. In that example, the material toughness of polylactic acid was improved by almost 20-fold relative to the unmodified polylactic acid control. Improvements in toughness and impact strength have important implications for commercial and consumer applications.

Lastly certain embodiments of this material will fully biodegrade under home composting conditions within 6-18 months.

EXAMPLES

Example 1

We conducted a preliminary gallate screening to determine boundaries of the system. Corn starch, propyl gallate, tributyl citrate (TBC), iron gluconate ([Fe]), and 30% hydrogen peroxide solution were used for preliminary screening. All materials procured from Sigma-Aldrich and used as received. [Fe] and hydrogen peroxide crosslinking system was utilized to enhance properties (i.e., strength, elongation, water sensitivity) and enhance compatibility between starch and polycaprolactone (PCL). [Fe] and hydrogen peroxide concentrations were calculated by weight on solids (i.e., for 30 g batch, 0.5% [Fe]/$H_2O_2$ corresponds to 0.15 g iron gluconate and 0.5 mL 30% hydrogen peroxide solution). Glycerol was excluded from the iron/peroxide calculation as it is believed to be a spectator in crosslinking. All materials screened via compounding in Xplore MC HT15 with 30 g batch size.

Operating Parameters

| | |
|---|---|
| Zone 1 Barrel Temperature | 175° C. |
| Zone 2 Barrel Temperature | 175° C. |
| Zone 3 Barrel Temperature | 175° C. |
| Screw Speed | 250 rpm |
| Residence Time | ~5-10 min - until no bubbles visible in extrudate, indicative of water driven off |

Screened formulations below with corresponding weight percentages:

| No. | PCL | Starch | Gallate | Glycerol | TBC | [Fe] | H₂O₂ | Processing Observations |
|---|---|---|---|---|---|---|---|---|
| 606-1 | 40 | 35 | 5 | 20 | 0 | 0.5 | 0.5 | Rough surface, poor flow, may be resolved with addition of suitable plasticizer |
| 606-2 | 40 | 32.5 | 5 | 20 | 2.5 | 0.5 | 0.5 | More homogeneous flow and smooth extrudate |
| 606-3 | 40 | 30 | 5 | 20 | 5 | 0.5 | 0.5 | Loss in strength, somewhat sticky |
| 606-4 | 40 | 32.5 | 5 | 20 | 2.5 | 0.5 | 1.5 | Loss in strength, longer residence time needed ~8-10 min |
| 606-5 | 40 | 37.5 | 5 | 15 | 2.5 | 0.5 | 0.5 | Change in deformation behavior, less uniform necking, poor mixing |
| 606-6 | 40 | 32.5 | 5 | 20 | 2.5 | 0.5 | 0.25 | Similar to 606-2, slower less visible color change |

Tensile data: Screened using mini dog-bones (Dimensions—thickness: 2.09 mm; width: 5.05 mm; gauge: 51.00 mm)

| No. | UTS (MPa) | Elongation at break (%) |
|---|---|---|
| 606-1 | 11.6656 | 673.875 |
| 606-2 | 13.5606 | 696.571 |
| 606-2 - pre-stretch (386%) | 55.0130 | 108.385 |
| 606-2 | 13.6198 | 779.135 |
| 606-3 | 12.4947 | 748.694 |
| 606-3 | 13.2645 | 793.349 |
| 606-4 | 11.9025 | 769.786 |
| 606-4 | 11.0143 | 689.726 |
| 606-5 | 8.23109 | 509.312 |
| 606-5 | 5.32948 | 285.506 |
| 606-6 | 9.82993 | 643.810 |
| 606-6 | 12.1394 | 720.120 |

Results/Observations: Gallate polymerization and cross-linking were visible by color change from initial off-white paste with some yellow-brown color from iron gluconate to a deep violet/indigo color, nearly black. Some heat was felt during mixing from exothermic reaction of crosslinking. When peroxide concentration was increased to 1.5%, heat was much more noticeable, and the color change was much faster, almost immediate.

Based on tensile data, there is a gain in strength and elongation with the addition of 2.5% plasticizer, tributyl citrate (TBC). Plasticizer loading is appropriate between 2-5% as there is a slight drop in mechanical properties at 5% compared to 2.5% loading. Glycerol is a key component to plasticizing and modifying the melt temperature of starch. Greater than 20% loading is necessary for uniform mixing and a two-fold increase in mechanical properties is observed when loading is adjusted from 15-20%. Increased peroxide loading appears to diminish mechanical properties. At high loading, starch and PCL chain cleavage may occur along with self-polymerization of gallate.

Strength fillers: Materials screened using corn starch, propyl gallate, and 0.5 wt % on solids of 30% hydrogen peroxide solution and iron gluconate.

| No. | PCL | Starch | Gallate | TBC | Gly | Filler | Observations |
|---|---|---|---|---|---|---|---|
| 606-7 | 40 | 24 | 5 | 3 | 20 | 3 MCC | |
| 606-8 | 40 | 24 | 5 | 3 | 20 | 3 CMC90K | Darker/faster color change |
| 606-9 | 40 | 24 | 5 | 3 | 20 | 3 CA | Minimal color change |
| 606-10 | 40 | 24 | 5 | 3 | 20 | 3 HEC | Darker color change |
| 606-11 | 40 | 24 | 5 | 3 | 20 | 3 Nanoclay | Less color change |

Tensile data: (+) sign denotes that sample slipped out of grip before break.

| No. | UTS (MPa) | Elongation at break (%) | Note |
|---|---|---|---|
| 606-7 | 14.2712 | 726.639 | |
| 606-8 | 10.4813 | 557.208 | |
| 606-9 | 12.3762 | 601.431 | void |
| 606-10 | 16.2845+ | 778.290+ | |
| 606-10 | 17.1728+ | 790.496+ | |
| 606-10 | 14.7449 | 735.626 | void - air bubble |
| 606-11 | 13.6790+ | 674.1714+ | very smooth, soft/flexible |

Strain hardening optimization: Material can be strain hardened to increase tensile strength similar to cold working steel. Total energy is conserved. Stretching energy is the energy required to prestrain the material by elongating "x" percent uniaxially. Breaking energy is the energy required to cause fracture. Total energy is the sum of stretching and breaking energy. Total energy (Toughness) is roughly 32±5 MPa. Differences arise from variability in injection-molded tensile bars due to small variances in processing (i.e., residence time, composition). Graphs (Prestretch, Cold-work) below show that strength and elongation at break are inversely proportional and could be tailored to specific applications. Material can be stretched cold or hot; material may be stretched uniaxially, or biaxially. Suitable methods of stretching are known in the art, and include tenter frame lines and tension/speed controlled rolls.

| Sample (605-10) | Un-stretched | 800% Prestretch (PS) | 600% PS | 400% PS | 150% PS |
|---|---|---|---|---|---|
| Stretching Energy (J) | 0 | 31.3 | 23.1 | 12.3 | 4.1 |
| Breaking Energy (J) | 46.5 | 7.89 | 15.2 | 23.4 | 38.3 |
| Total Energy (J) | 46.5 | 39.2 | 28.3 | 35.7 | 42.4 |
| UTS (MPa) | 17.8 | 106 | 92.3 | 61.8 | 39.5 |
| Elongation at break (%) | 880 | 35.9 | 45.7 | 108 | 361 |

Example 2

For the experiments in this example we began with a pelletized composite ("Composite A") with the following composition:

| Ingredient | Wt % |
|---|---|
| Starch | 24.03 |
| PCL | 53.86 |
| Propyl gallate | 4.01 |
| Sorbitol | 12.02 |
| Glycerol | 5.58 |
| FeGluconate | 0.5 |

Composite A was mixed with several different filler materials and the resulting composition was tested for yield stress, break strain, and break stress.

| | Yield Stress (MPa) | Break Strain (% elongation) | Break Stress (MPa) |
|---|---|---|---|
| Unfilled Composite A (55% PCL resin) | 10.4 | 860 | 25.5 |
| Composite A, 10% ¼" carbon fiber, 5% graphite | n/a | 6.3 | 21.3 |
| Composite A, 20% boron nitride | 10.1 | 730 | 19.9 |
| Composite A, ¼" carbon fiber | n/a | 6.2 | 22.4 |
| Composite A, 5% K15 hollow glass spheres | 9.6 | 760 | 21 |
| Composite A, 5% superhydrophobic fumed silica | 10.1 | 876 | 23 |
| Composite A, 15% graphite | 10 | 457 | 12 |
| Compoiste A, chopped flax/linen fiber | n/a | <5 | 19 |

Example 3

In this experiment we compared the properties of a polymer composite prepared as described herein with a control (commercially available polylactic acid ("PLA"), Ingeo® 3D850). The PLA composite had the following composition:

| Base Resin | Ingeo 3D850 | 88% |
|---|---|---|
| Compatibilizing Complex | Propyl Gallate | 1.48% |
| | Poly(Ethylene Glycol) | 10.50% |
| | Fe(II) Gluconate | 0.02% |

The following processing conditions were used:

| Processing Conditions | |
|---|---|
| Extruder type | Brabender KETSE 20/40 twin-screw |
| Screw Diameter | 20 mm |
| L/D | 40:1 |
| Barrel Temperature | 180-220° C. |
| Die Temperature | 180° C. |
| Die type | strand |
| RPM | 180-230 |
| vented? | Yes, passive |
| Feed type | pellet, liquid |

ASTM methods used in the Examples are listed below, with links to the publicly available protocols.

| Property | Method | ASTM Website Link |
|---|---|---|
| Tensile Yield Strength | ASTM D638 | https://www.astm.org/d0638-14.html |
| Tensile Strength at Break | ASTM D638 | https://www.astm.org/d0638-14.html |
| Tensile Modulus | ASTM D638 | https://www.astm.org/d0638-14.html |
| Strain at Break | ASTM D638 | https://www.astm.org/d0638-14.html |
| Toughness | ASTM D638 | https://www.astm.org/d0638-14.html |
| Flexural Strength | ASTM D790 | https://www.astm.org/d0790-10.html |
| Flexural Modulus | ASTM D790 | https://www.astm.org/d0790-10.html |
| Gardner Impact | ASTM D5420 | https://www.astm.org/d5420-04.html |
| Melt Flow Rate | ASTM D1238 | https://www.astm.org/d1238-23.html |
| Melt Temperature | ASTM D3418 | https://www.astm.org/d3418-82r88e01.html |
| Hardness | ASTM D2240 | https://www.astm.org/d2240-15r21.html |

The results are shown below.

| Material Properties | ASTM Test Method | Control polylactic acid | NMCB-PLA-HI | NMCB-PLA-HY | Units |
|---|---|---|---|---|---|
| Tensile Yield Strength | D638[1] | 65.5 | 40.8 | 51.4 | Mpa |
| Tensile Strength at Break | D638[1] | 24.8 | 20.5 | 21.3 | Mpa |
| Tensile Modulus | D638[1] | 2180 | 1800 | 2010 | Mpa |
| Strain at Break | D638[1] | 7.2 | 200 | 81 | % |
| Toughness | D638[1] | 1.05 | 20.7 | 8.84 | J |
| Flexural Strength | D790[2] | 99.2 | 44.7 | 57.0 | Mpa |
| Flexural Modulus | D790[2] | 3210 | 1570 | 2450 | Mpa |
| Gardner Impact | D5420[3] | <0.226 | 6.78 | 0.904 | J |
| Melt Flow Rate | D1238[4] | 4.06 | >50 | >50 | g/10 min |
| Melt Temperature | D3418[5] | 160-186 (peak 175) | 147-173 (peak 167) | 147-173 (peak 167) | °C. |
| Hardness | D2240 | 84 | 78 | 83 | D |

[1] 50 mm/min, conditioned 34% RH for 24 h
[2] 1.7 mm/min, conditioned 34% RH for 24 h
[3] GC geometry, 1.5 mm specimen thickness
[4] 190° C., 2.16 kg
[5] 10° C./min This comparison shows that key properties of NMBC-PLA-HI and NMBC-PLA-HY which are enhanced compared to control include impact strength, elongation gains, toughness, and processability. Both embodiments are useful for producing durable, biobased materials with tunable end use.

Example 4

In this experiment we compared the properties of a polymer composite prepared as described herein with a control (commercially available polyamide 6 ("PA6"), Ultramid® B36LN 01). The PA6 composite had the following composition:

| Base Resin | Ultramid B36LN 01 | 90% |
|---|---|---|
| Compatibilizing Complex | Propyl Gallate | 5.33% |
| | Sorbitol | 4.58% |
| | Fe(II) Gluconate | 0.09% |

The following processing conditions were used:

| Processing Conditions | |
|---|---|
| Extruder | Brabender KETSE 20/40 |
| type | twin-screw |
| Screw Diameter | 20 mm |
| L/D | 40:1 |
| Barrel Temperature | 210-230° C. |
| Die Temperature | 210° C. |
| Die type | strand |
| RPM | 80 |
| vented? | yes, passive |
| Feed type | pellet, powder |

ASTM methods used as described above. The results are shown below.

| Material Properties | ASTM Test Method | Control polyamide 6 | NMCB-PA6 | Composite Control 20 wt % milled carbon fiber (250 μm) polyamide 6 | 20 wt % milled carbon fiber (250 μm) + NMCB-PA6 |
|---|---|---|---|---|---|
| Tensile Yield Strength | D638[1] | 65.4 | 55.2 | n/a | n/a |
| Tensile Strength at Break | D638[1] | 70.1 | 73.7 | 100.4 | 132.1 |
| Tensile Modulus | D638[1] | 2180 | 1880 | 4775 | 6193 |
| Strain at Break | D638[1] | 190 | 310 | 5 | 4 |
| Toughness | D638[1] | 53.8 | 70.8 | n/a | n/a |
| Flexural Strength | D790[2] | n/a | n/a | 155.1 | 185.4 |
| Flexural Modulus | D790[2] | n/a | n/a | 6533 | 8172 |
| Gardner Impact | D5420[3] | 21.7 | 29.8 | n/a | n/a |
| Melt Flow Rate | D1238[4] | 6.73 | >40 | n/a | n/a |
| Melt Temperature | D3418[5] | 194-231 (peak 221) | 184-220 (peak 213) | n/a | n/a |
| Hardness | D2240 | 79 | 76 | n/a | n/a |

[1] 50 mm/min, conditioned 34% RH for 24 h
[2] 1.7 mm/min, conditioned 34% RH for 24 h
[3] GC geometry, 1.5 mm specimen thickness
[4] 190° C., 2.16 kg
[5] 10° C./min Key enhanced properties of NMCB-PA6 include impact strength, elongation gains, toughness, and processability. Composites including polyimide 6 (such as NMCP-PA6) see enhanced filler efficiency and processability resulting in stronger composites at lower loadings of expensive fillers such as carbon fiber.

Example 5

In this experiment we compared the properties of a polymer composite prepared as described herein with a control (commercially available polyamide 6,6, Zytel® 101L). The PA66 composite had the following composition:

| Base Resin | Zytel 101L | 94% |
| --- | --- | --- |
| Compatibilizing Complex | Propyl Gallate | 3.20% |
| | Sorbitol | 2.75% |
| | Fe(II) Gluconate | 0.05% |

The following processing conditions were used:

| Processing Conditions | |
| --- | --- |
| Extruder | Brabender KETSE 20/40 |
| type | twin-screw |
| Screw Diameter | 20 mm |
| L/D | 40:1 |
| Barrel Temperature | 210-255° C. |
| Die Temperature | 210° C. |
| Die type | strand |
| RPM | 150-200 |
| vented? | yes, vacuum |
| Feed type | pellet, powder |

ASTM methods used as described above. The results are shown below.

| Material Properties | ASTM Test Method | Control polyamide 6,6 | NMCB-PA66 | Units |
| --- | --- | --- | --- | --- |
| Tensile Yield Strength | D638[1] | 60.5 | 44.1 | MPa |
| Tensile Strength at Break | D638[1] | 71.7 | 74.9 | MPa |
| Tensile Modulus | D638[1] | 1730 | 1430 | MPa |
| Strain at Break | D638[1] | 240 | 300 | % |
| Toughness | D638[1] | 60.9 | 73.5 | J |
| Flexural Strength | D790[2] | 96.1 | 59.8 | MPa |
| Flexural Modulus | D790[2] | 2280 | 1720 | MPa |
| Gardner Impact | D5420[3] | >38.0 | >38.0 | J |
| Melt Flow Rate | D1238[4] | 24.0 | >50 | g/10 min |
| Melt Temperature | D3418[5] | 230-259 (peak 253) | 190-224 (peak 217) | ° C. |
| Hardness | D2240 | 81 | 80 | D |

[1] 50 mm/min, conditioned 34% RH for 24 h
[2] 1.7 mm/min, conditioned 34% RH for 24 h
[3] GC geometry, 1.5 mm specimen thickness
[4] 275° C., 1.2 kg (control) and 230° C., 1.285 kg (NMCB-PA66)
[5] 10° C./min Key materials properties enhanced in NMCB-PA66 compared to control include elongation gains, increased ultimate tensile strength, toughness, and processability.

Example 6

In this experiment we compared the properties of a polymer composite prepared as described herein with a control (commercially available polypropylene copolymer ("PPcP"), Profax® SB786). The PPcP composite had the following composition:

| Base Resin | Profax SB786 | 95% |
| --- | --- | --- |
| Compatibilizing Complex | Propyl Gallate | 0.62% |
| | Poly(Ethylene Glycol) | 4.37% |
| | Fe(II) Gluconate | 0.01% |

The following processing conditions were used:

| Processing Conditions | |
| --- | --- |
| Extruder | Brabender KETSE 20/40 |
| Type | twin-screw |
| Screw Diameter | 20 mm |
| L/D | 40:1 |
| Barrel Temperature | 190-220° C. |
| Die Temperature | 180° C. |
| Die type | Strand |
| RPM | 190-230 |
| vented? | yes, passive |
| Feed type | pellet, liquid |

ASTM methods used as described above. The results are shown below.

| Material Properties | ASTM Test Method | Control polypropylene copolymer | NMCB-PPCP | Units |
| --- | --- | --- | --- | --- |
| Tensile Yield Strength | D638[1] | 24.8 | 23.3 | MPa |
| Tensile Strength at Break | D638[1] | 16.8 | 23.8 | MPa |
| Tensile Modulus | D638[1] | 1120 | 1050 | MPa |
| Strain at Break | D638[1] | 74 | 490 | % |
| Toughness | D638[1] | 7.12 | 50.9 | J |
| Flexural Strength | D790[2] | 27.4 | 25.8 | MPa |
| Flexural Modulus | D790[2] | 523 | 898 | MPa |
| Gardner Impact | D5420[3] | 19.9 | 13.6 | J |
| Melt Flow Rate | D1238[4] | 4.5 | 14.9 | g/10 min |
| Melt Temperature | D3418[5] | 147-174 (peak 164) | 147-173 (peak 165) | ° C. |
| Hardness | D2240 | 63 | 62 | D |

[1] 50 mm/min, conditioned 34% RH for 24 h
[2] 1.7 mm/min, conditioned 34% RH for 24 h
[3] GC geometry, 1.5 mm specimen thickness
[4] 210° C., 2.16 kg
[5] 10° C./min Key materials properties enhanced in the NMCB-PCPP compared to control include elongation gains, toughness, and processability. Inclusion of polyolefins such as polypropylene in these composites should help prevent embrittlement in recycled materials and is receptive to flexible composite applications.

Example 7

In this experiment we compared the properties of a polymer composite prepared as described herein with a control (commercially available thermoplastic polyurethane ("TPU"), Texin® 285A). The TPU composite had the following composition:

| Base Resin | Texin 285A | 97% |
|---|---|---|
| Compatibilizing Complex | Propyl Gallate | 1.60% |
| | Sorbitol | 1.37% |
| | Fe(II) Gluconate | 0.03% |

The following processing conditions were used:

| Processing Conditions | |
|---|---|
| Extruder | Brabender KETSE 20/40 |
| type | twin-screw |
| Screw Diameter | 20 mm |
| L/D | 40:1 |
| Barrel Temperature | 170-200° C. |
| Die Temperature | 200° C. |
| Die type | strand |
| RPM | 80 |
| vented? | yes, passive |
| Feed type | pellet, powder |

ASTM methods used as described above. The results are shown below.

| Material Properties | ASTM Test Method | Control shore A thermoplastic urethane | NMCB-TPUA | Units |
|---|---|---|---|---|
| Tensile Stress at 50% Elongation | D638[1] | 5.71 | 3.14 | MPa |
| Tensile Stress at 100% Elongation | D638[1] | 6.84 | 3.77 | MPa |
| Tensile Stress at 300% Elongation | D638[1] | 13.8 | 8.35 | MPa |
| Tensile Strength at Break | D638[1] | 30.8 | 43.7 | MPa |
| Strain at Break | D638[1] | 600 | 780 | % |
| Toughness | D638[1] | 47.3 | 68.3 | J |
| Flexural Strength | D790[2] | n/a | n/a | MPa |
| Flexural Modulus | D790[2] | n/a | n/a | MPa |
| Gardner Impact | D5420[3] | n/a | n/a | J |
| Melt Flow Rate | D1238[4] | >50 | >50 | g/10 min |
| Glass Transition Temperature | D3418[5] | −42 | −41 | ° C. |
| Hardness | D2240 | 34 | 31 | D |

[1]50 mm/min, conditioned 34% RH for 24 h
[2]1.7 mm/min, conditioned 34% RH for 24 h
[3]GC geometry, 1.5 mm specimen thickness
[4]230° C., 2.16 kg
[5]10° C./min Key materials properties enhanced in NMCB-TPUA compared to control material include strong increase to ultimate tensile strength, elongation gains, and toughness. Useful applications of these materials include injection molding flexible durable parts, super tough 3D printed TPUs, and tougher/more durable soft-touch materials such as faux leather.

Example 8

In this experiment we compared the properties of a polymer composition prepared as described herein with a control (commercially available polycarbonate ("PC"), Ultra PC HF 22). The PC composite had the following composition:

| Base Resin | Ultra PC HF 22 | 95% |
|---|---|---|
| Compatibilizing Complex | Propyl Gallate | 1.10% |
| | Poly(Ethylene Glycol) | 3.89% |
| | Fe(II) Gluconate | 0.01% |

The following processing conditions were used:

| Processing Conditions | |
|---|---|
| Extruder | Brabender KETSE 20/40 |
| type | twin-screw |
| Screw Diameter | 20 mm |
| L/D | 40:1 |
| Barrel Temperature | 220-270° C. |
| Die Temperature | 210° C. |
| Die type | strand |
| RPM | 220 |
| vented? | no |
| Feed type | pellet, powder |

ASTM methods used as described above. The results are shown below.

| Material Properties | ASTM Test Method | Control polycarbonate | NMCB-PC | Units |
|---|---|---|---|---|
| Tensile Yield Strength | D638[1] | 61.1 | 74.9 | MPa |
| Tensile Strength at Break | D638[1] | 65.4 | 58.3 | MPa |
| Tensile Modulus | D638[1] | 1730 | 2030 | MPa |
| Strain at Break | D638[1] | 96 | 52 | % |
| Toughness | D638[1] | 26.1 | 15.4 | J |
| Flexural Strength | D790[2] | 92.9 | 110 | MPa |
| Flexural Modulus | D790[2] | 2190 | 2740 | MPa |
| Gardner Impact | D5420[3] | n/a | n/a | J |
| Melt Flow Rate | D1238[4] | 17.8 | 8.0 | g/10 min |
| Glass Transition Temperature | D3418[5] | 148 | 119 | ° C. |
| Hardness | D2240 | 81 | 85 | D |

[1]50 mm/min, conditioned 34% RH for 24 h
[2]1.7 mm/min, conditioned 34% RH for 24 h
[3]GC geometry, 1.5 mm specimen thickness
[4]240° C., 8.16 kg (Control polycarbonate) and 210° C., 5 kg (NMCB-PC)
[5]10° C./min Key materials properties enhanced in NMCB-PC compared to control include increase to yield strength, hardness, tensile modulus, flexural strength and flexural modulus. These enhancements will allow the material to be used in engineering applications where there is a need for a translucent material that has greater material stress resistance.

Example 9

In this experiment we compared the properties of a polymer composite prepared as described herein with a control (commercially available polybutylene succinate ("PBS"), BioPBS™ FZ91PB). The PBS composite had the following composition:

| Base Resin | BioPBS FZ91PB | 90% |
|---|---|---|
| Compatibilizing Complex | Propyl Gallate | 5.33% |
| | Sorbitol | 4.58% |
| | Fe(II) Gluconate | 0.09% |

The following processing conditions were used:

| Processing Conditions | |
|---|---|
| Extruder | Brabender KETSE 20/40 |
| Type | twin-screw |
| Screw Diameter | 20 mm |
| L/D | 40:1 |
| Barrel Temperature | 170-190° C. |
| Die Temperature | 160° C. |
| Die type | strand |
| RPM | 120-180 |
| vented? | yes, passive |
| Feed type | pellet, powder |

ASTM methods used as described above. The results are shown below.

| Material Properties | ASTM Test Method | Control polybutylene succinate | Enhanced Embodiments | | Units |
|---|---|---|---|---|---|
| | | | NMCB-PBS-HY | NMCB-PBS-HI | |
| Tensile Yield Strength | D638[1] | 33.6 | 24.2 | 20.1 | MPa |
| Tensile Strength at Break | D638[1] | 40.9 | 40.6 | 39.3 | MPa |
| Tensile Modulus | D638[1] | 491 | 355 | 323 | MPa |
| Strain at Break | D638[1] | 250 | 360 | 420 | % |
| Toughness | D638[1] | 44.6 | 59.8 | 62.0 | J |
| Flexural Strength | D790[2] | n/a | n/a | n/a | MPa |
| Flexural Modulus | D790[2] | n/a | n/a | n/a | MPa |
| Gardner Impact | D5420[3] | <0.452 | 16.3 | 22.6 | J |
| Melt Flow Rate | D1238[4] | 5.00 | 24.8 | 28.5 | g/10 min |
| Melt Temperature | D3418[5] | 68-94 (peak 87) | 96-117 (peak 110) | 96-117 (peak 110) | ° C. |
| Hardness | D2240 | 67 | 59 | 58 | D |

[1]50 mm/min, conditioned 34% RH for 24 h
[2]1.7 mm/min, conditioned 34% RH for 24 h
[3]GC geometry, 1.5 mm specimen thickness
[4]190° C., 2.16 kg
[5]10° C./min Key materials properties enhanced in the NMCB-PBS-HI and NMCB-PBS-HY compared to controls include impact strength, yield strength retention, ultimate tensile strength retention, increased elongation, plus an increase in softening temperature and peak melt point. Despite the gains in performance, the strong biodegradability of the material is maintained. The resulting mixture enables strong performing biobased composites with inexpensive fillers such as starch, coffee grounds, and byproduct natural fibers.

Example 10

In this experiment we compared the properties of a starch-filled polymer composite prepared as described herein with a control (commercially available polybutylene succinate ("PBS"), BioPBS™ FZ91PB). The starch-filled PBS composite had the following composition:

| Base Resin | BioPBS FZ91PB | 60% |
|---|---|---|
| Compatibilizing Complex | Propyl Gallate | 3.5% |
| | Sorbitol | 12.2% |
| | Glycerol | 3.5% |
| | Fe(II) Gluconate | 0.4% |
| Filler | Starch | 20.40% |

The following processing conditions were used:

| Processing Conditions | |
|---|---|
| Extruder | Brabender KETSE 20/40 |
| Type | twin-screw |
| Screw Diameter | 20 mm |
| L/D | 40:1 |
| Barrel Temperature | 170-190° C. |
| Die Temperature | 160° C. |
| Die type | strand |
| RPM | 120-180 |
| vented? | yes, passive |
| Feed type | pellet, powder |

ASTM methods used as described above. The results are shown below.

| Material Properties | ASTM Test Method | Control polybutylene succinate | NMCB-PBS-S | Units |
|---|---|---|---|---|
| Tensile Yield Strength | D638[1] | 33.6 | 22.9 | MPa |
| Tensile Strength at Break | D638[1] | 40.9 | 35.1 | MPa |
| Tensile Modulus | D638[1] | 491 | 380 | MPa |
| Strain at Break | D638[1] | 250 | 360 | % |
| Toughness | D638[1] | 44.6 | 51.8 | J |
| Flexural Strength | D790[2] | n/a | n/a | MPa |
| Flexural Modulus | D790[2] | n/a | n/a | MPa |
| Gardner Impact | D5420[3] | <0.452 | 4.52 | J |
| Melt Flow Rate | D1238[4] | 5.00 | 30.4 | g/10 min |
| Melt Temperature | D3418[5] | 70-95 (peak 87) | 93-121 (peak 113) | ° C. |
| Hardness | D2240 | 67 | 64 | D |

[1]50 mm/min, conditioned 34% RH for 24 h
[2]1.7 mm/min, conditioned 34% RH for 24 h
[3]GC geometry, 1.5 mm specimen thickness
[4]190° C., 2.16 kg
[5]10° C./min Key materials properties enhanced in the NMCB-PBS-S material compared to controls include impact strength, yield strength retention, ultimate tensile strength retention, increased elongation, comparable hardness, and a strong increase in softening temperature and peak melt point. The resulting composite has enhanced biodegradability and reduced cost while retaining or gaining properties suitable for quality single use consumer and industrial goods.

What is claimed is:

1. A composition comprising about 1-99 wt % of a first polymer, about 0.1-15 wt % of a first phenolic compound, optionally up to about 40 wt % of an alcohol, and about 0.001-5 wt % of a first Lewis acid catalyst; wherein the first phenolic compound is selected from the group consisting of (−)-Epicatechin, (−)-Epicatechin 3-O-gallate, (−)-Epicatechin-(2a-7)(4a-8)-epicatechin 3-O-galactoside, (−)-Epigallocatechin, (−)-Epigallocatechin 3'-O-glucuronide, (−)-Epigallocatechin 3-O-glucuronide, (−)-Epigallocatechin 7-O-glucuronide, (+)-Catechin, (+)-Catechin 3-O-gallate, (+)-Catechin 3-O-glucose, (+)-Gallocatechin, (+)-Gallocatechin 3-O-gallate, 1,5-Dicaffeoylquinic acid, 2,3-Dihydroxybenzoic acid, 2,5-di-S-Glutathionyl caftaric acid, 2-Hydroxyenterodiol, 2'-Hydroxyenterolactone, 2-Hydroxyenterolactone,3-(3,4-Dihydroxyphenyl)-2-methoxypropionic acid, 3',4',5,7-Tetrahydroxyisoflavanone, 3',4',7-Trihydroxyisoflavan, 3',4',7-Trihydroxyisoflavanone, 3,4-dihydroxyphenylethanol acetate, 3,4-dihydroxyphenylethanol elenolic acid, 3,4-dihydroxyphenylethanol elenolic acid dialdehyde, 3,4-Dicaffeoylquinic acid, 3,4-Diferuloylquinic acid, 3,4-Dihydroxyphenylacetic acid, 3,4-Dihydroxyphenylglycol, 3,4-Dihydroxyphenyllactic acid methyl ester, 3'-Hydroxydaidzein, 3'-Hydroxyequol, 3'-Hydroxygenistein, 3'-Hydroxymelanettin, 3'-Hydroxy-O-desmethylangolensin, 3-Hydroxyphloretin 2'-O-glucoside, 3-Hydroxyphloretin 2'-O-xylosyl-glucoside, 3-Methylcatechol, 3-O-Methylgallic acid, 3-O-Methylrosmarinic acid, 4',4"-O-Dimethylepigallocatechin 3-O-gallate, 4,5-Dicaffeoylquinic acid, 4',6,7-Trihydroxyisoflavanone, 4-Caffeoylquinic acid, 4-Ethylcatechol, 4-Hydroxy-(3',4'-dihydroxyphenyl)valeric acid, 4-Methylcatechol, 4"-O-Methylepigallocatechin 3-O-gallate, 4-tert-butylcatechol, 5-(3',4',5'-trihydroxyphenyl)-v-valerolactone, 5-(3',4',-dihydroxyphenyl)-γ-valerolactone, 5-(3',4'-dihydroxyphenyl)-valeric acid, 5,6,7,3',4'-Pentahydroxyisoflavone, 5,6,7,4'-Tetrahydroxyisoflavone, 5,6-Dihydroxy-7,8,3',4'-tetramethoxyflavone, 5,7,8,3',4'-Pentahydroxyisoflavone, 5,7,8,4'-Tetrahydroxyisoflavone, 5,7-Dihydroxy-8,4'-dimethoxyisoflavone, 5-Caffeoylquinic acid, 5'-Hydroxy-O-desmethylangolensin, 5-O-Galloylquinic acid, 6,7,3',4'-Tetrahydroxyisoflavone, 6,7,4'-Trihydroxyisoflavone, 6,8-Dihydroxykaempferol, 6-Hydroxydihydrodaidzein, 6-Hydroxyluteolin, 6-Hydroxyluteolin 7-O-rhamnoside, 7,3',4'-Trihydroxyflavone, 7,8,3',4'-Tetrahydroxyisoflavone, 7,8,4'-Trihydroxyisoflavone, Avenanthramide 2c, Avenanthramide K, Baicalein, Butein, Butin, Caffeic acid, Caffeic acid 3-O-glucuronide, Caffeic acid 3-sulfate, Caffeic acid 4-O-glucoside, Caffeic acid 4-O-glucuronide, Caffeic acid 4-sulfate, Caffeic acid ethyl ester, Caffeoyl aspartic acid, Caffeoyl C1-glucuronide, Caffeoyl glucose, Caffeoyl tartaric acid, Carnosic acid, Carnosol, Catechol, Chicoric acid, Cyanidin, Cyanidin 3,5-O-diglucoside, Cyanidin 3-O-(2-O-(6-O-(E)-caffeoyl-D glucoside)-D-glucoside)-5-O-D-glucoside, Cyanidin 3-O-(3",6"-O-dimalonyl-glucoside), Cyanidin 3-O-(6"-acetyl-galactoside), Cyanidin 3-O-(6"-acetyl-glucoside), Cyanidin 3-O-(6"-caffeoyl-glucoside), Cyanidin 3-O-(6"-dioxalyl-glucoside), Cyanidin 3-O-(6"-malonyl-3"-glucosyl-glucoside), Cyanidin 3-O-(6"-malonyl-glucoside), Cyanidin 3-O-(6"-p-coumaroyl-glucoside), Cyanidin 3-O-(6"-succinyl-glucoside), Cyanidin 3-O-arabinoside, Cyanidin 3-O-diglucoside-5-O-glucoside, Cyanidin 3-O-galactoside, Cyanidin 3-O-glucoside, Cyanidin 3-O-glucosyl-rutinoside, Cyanidin 3-O-rutinoside, Cyanidin 3-O-sambubioside, Cyanidin 3-O-sambubioside 5-O-glucoside, Cyanidin 3-O-sophoroside, Cyanidin 3-O-xyloside, Cyanidin 3-O-xylosyl-rutinoside, Danshensu, Delphinidin 3,5-O-diglucoside, Delphinidin 3-O-(6"-acetyl-galactoside), Delphinidin 3-O-(6"-acetyl-glucoside), Delphinidin 3-O-(6"-p-coumaroyl-glucoside), Delphinidin 3-O-arabinoside, Delphinidin 3-O-feruloyl-glucoside, Delphinidin 3-O-galactoside, Delphinidin 3-O-glucoside, Delphinidin 3-O-glucosyl-glucoside, Delphinidin 3-O-rutinoside, Delphinidin 3-O-sambubioside, Delphinidin 3-O-xyloside, Dihydrocaffeic acid, Dihydrocaffeic acid 3-O-glucuronide, Dihydrocaffeic acid 3-sulfate, Dihydromyricetin 3-O-rhamnoside, Dihydroquercetin, Dihydroquercetin 3-O-rhamnoside, Ellagic acid, Ellagic acid acetyl-arabinoside, Ellagic acid acetyl-xyloside, Ellagic acid arabinoside, Ellagic acid glucoside, Epicatechin 7-O-glucuronide, Epirosmanol, Eriocitrin, Eriodictyol, Eriodictyol 7-O-glucoside, Esculetin, Ethyl gallate, Gallagic acid, Gallic acid, Gallic acid 3-O-gallate, Gallic acid 4-O-glucoside, Gallic acid ethyl ester, Gallic aldehyde, Galloyl glucose, Hydroxycaffeic acid, Hydroxydanshensu, Hydroxytyrosol, Hydroxytyrosol 4-O-glucoside, Isopropyl 3-(3,4-dihydroxyphenyl)-2-hydroxypropanoate, Koparin, Lambertianin C, Lauryl gallate, Lithospermic acid, Luteolin, Luteolin 6-C-glucoside, Luteolin 7-O-(2-apiosyl-6-malonyl)-glucoside, Luteolin 7-O-(2-apiosyl-glucoside), Luteolin 7-O-diglucuronide, Luteolin 7-O-glucoside, Luteolin 7-O-glucuronide, Luteolin 7-O-malonyl-glucoside, Luteolin 7-O-rutinoside, methyl gallate, Myricetin, Myricetin 3-O-arabinoside, Myricetin 3-O-galactoside, Myricetin 3-O-glucoside, Myricetin 3-O-rhamnoside, Myricetin 3-O-rutinoside, Neoeriocitrin, Nepetin, Norathyriol, Oleuropein, Oleuropein-aglycone, Orobol, Pebrellin, Procyanidin dimer B1, Procyanidin dimer B2, Procyanidin dimer B3, Procyanidin dimer B4, Procyanidin dimer B5, Procyanidin dimer B7, Procyanidin trimer C1, Procyanidin trimer C2, Procyanidin trimer EEC, Procyanidin trimer T2, Prodelphinidin dimer B3, Prodelphinidin trimer C-GC-C, Prodelphinidin trimer GC-C-C, Prodelphinidin trimer GC-GC-C, Propyl gallate, Protocatechuic acid, Protocatechuic acid 4-O-glucoside, Propyl gallate, Protocatechuic aldehyde, Punicalagin, Punicalin, Pyrocatechol, Pyrogallol, Quercetin, Quercetin 3,4'-O-diglucoside, Quercetin 3-O-(6"-malonyl-glucoside), Quercetin 3-O-(6"-malonyl-glucoside) 7-O-glucoside, Quercetin 3-O-(6"-acetyl-galactoside) 7-O-rhamnoside, Quercetin 3-O-acetyl-rhamnoside, Quercetin 3-O-arabinoside, Quercetin 3-O-galactoside, Quercetin 3-O-galactoside 7-O-rhamnoside, Quercetin 3-O-glucoside, Quercetin 3-O-glucosyl-rhamnosyl-galactoside, Quercetin 3-O-glucosyl-rhamnosyl-glucoside, Quercetin 3-O-glucosyl-xyloside, Quercetin 3'-O-glucuronide, Quercetin 3-O-glucuronide, Quercetin 3-O-rhamnoside, Quercetin 3-O-rhamnosyl-galactoside, Quercetin 3-O-rhamnosyl-rhamnosyl-glucoside, Quercetin 3-O-rutinoside, Quercetin 3-O-sophoroside, Quercetin 3-O-xyloside, Quercetin 3-O-xylosyl-glucuronide, Quercetin 3-O-xylosyl-rutinoside, Quercetin 3'-sulfate, Quercetin 4'-O-glucoside, Quercetin 4'-O-glucuronide, Quercetin 7,4'-O-diglucoside, Rhamnetin, Rosmanol, Rosmarinic acid, Salvianolic acid B, Salvianolic acid C, Salvianolic acid D, Salvianolic acid G, Sanguiin H-6, Scutellarein, stearyl gallate, Theaflavin, Theaflavin 3,3'-O-digallate, Theaflavin 3'-O-gallate, Theaflavin 3-O-gallate, Valoneic acid dilactone, Verbascoside, and mixtures thereof.

2. The composition of claim 1, further comprising a second polymer.

3. The composition of claim 1, further comprising a second Lewis acid catalyst.

4. The composition of claim 1, further comprising a second phenolic compound.

5. The composition of claim 2, further comprising a second phenolic compound.

6. The composition of claim 1, further comprising 1-95 wt % of a filler.

7. The composition of claim 1, wherein the first polymer is selected from the group consisting of thermoplastics, thermosets, and elastomers.

8. The composition of claim 7, wherein the first polymer is a non-biodegradable thermoplastic polymer selected from the group consisting of terpolymers, polyacetals, polyacrylates, cyclic olefin copolymers, elastomers, fluoropolymers, ionomers, polyamides, polybenzimidazoles, polybutene, polycarbonates, polyesters, polyimides, polyketones, polyolefins, polyphenyl ethers, polyphenylene sulfides, polyphenylsulfones, polyphthalamides, polyphthalate carbonates, polystyrenes, polysulfones, polyurethane, polyvinyl dichloride, polysilicones, polysiloxanes,
   styrene maleic anhydride, polyvinyls, polyethyleneimines, polyquinoxalines, polybenzoxazoles, polyoxadiazoles, polyoxatriazoles, polyacrylamides, polyamide imides, and polyethers, and mixtures thereof.

9. The composition of claim 7, wherein the first polymer is a biodegradable thermoplastic polymer selected from the group consisting of polyhydroxyalkanoates, polylactides, aliphatic polyesters, aromatic polyesters, polylactones, polyamides, polyanhydrides, polyorthoesters, polyketals, polyester amides, polyvinyl alcohols, polyvinyl acetates, polyhydroxy acids, and polyamino acids.

10. The composition of claim 1, wherein the alcohol is a simple alcohol, a diol, a triol, or a polyol.

11. The composition of claim 1, wherein the alcohol is selected from the group consisting of glycerol, dodecanol, benzyl alcohol, hexanediol, hexanetriol, pentaerythritol, dipentaerythritol, tripentaerythritol, erythritol, xylitol, sorbitol, mannitol, triglycerol, propylene glycol, ethylene glycol, polyethylene glycol, butanediol, ethanediol, propanediol, terpinene-1-ol, trimethylolethane, glucitol diacetate, and mixtures thereof.

12. The composition of claim 1, wherein the Lewis acid catalyst is selected from the group consisting of transition metal complexes, metal oxides, metalloid oxides, metallic nanoparticles, and main-group Lewis acids.

13. The composition of claim 12, wherein the Lewis acid catalyst is a transition metal complex selected from the group consisting of iron (II) acetate, iron (III) acetate, iron (0) pentacarbonyl, iron (II) fumarate, iron (III) phosphate, iron (II) gluconate, copper (I) iodide, copper (II) iodide, copper (I) acetate, copper (II) acetate, copper (II) gluconate, copper (II) phosphate, copper (II) acetylacetonate, dichlorozirconocene, dimethylzirconocene, zirconium (IV) ethoxide.

14. The composition of claim 12, wherein the Lewis acid catalyst is selected from the group consisting of iron (II) oxide, iron (III) oxide, titanium oxide, zirconium oxide, boron oxide (borate), and/or aluminum oxide.

15. The composition of claim 12, wherein the Lewis acid catalyst is a metallic nanoparticle selected from the group consisting of iron nanoparticles, ruthenium nanoparticles, and/or gold nanoparticles.

16. The composition of claim 12, wherein the Lewis acid catalyst is a main-group Lewis acid selected from the group consisting of tris(perfluorophenyl)borane, triphenylborane, trimethylborate, boron trichloride, and aluminium trichloride.

17. The composition of claim 6, wherein the filler is biodegradable.

18. The composition of claim 17, wherein the biodegradable filler is selected from the group consisting of agricultural waste products, bio-derived fibers, and biopolymers.

19. The composition of claim 17, wherein the biodegradable filler is an agricultural waste product selected from the group consisting of corn husk, cranberry hull, cranberry pomace, nut shell waste, palm kernel shell, coffee berry pulp, apple waste, coarse sawdust, coffee grounds, almond hull, almond husk, walnut shell, wood flour, sugar cane base, processed vegetable waste, corn cob, coconut waste, pineapple pulp, and mixtures thereof.

20. The composition of claim 17, wherein the biodegradable filler is a bio-derived fiber selected from the group consisting of ramie fibers, rattan fibers, vine fiber, jute fibers, kenaf fibers, flax fibers, cotton wool, coconut fiber, silk, hemp, banana fibers and mixtures thereof.

21. The composition of claim 17, wherein the biodegradable filler is a biopolymer selected from the group consisting of cellulose, polypeptides, chitin, chitosan, polysaccharides, rubber, collagen, proteins, lignins, lignocellulose, pectin, starches, fibroin, lipids, glycogen, flour, gums, and mixtures thereof.

22. The composition of claim 6, wherein the filler is non-biodegradable.

23. The composition of claim 22, wherein the non-biodegradable filler is selected from the group consisting of engineering materials, advanced carbon materials, recycled waste materials, and naturally-occurring inorganic materials.

24. The composition of claim 22, wherein the non-biodegradable filler comprises an engineering material selected from the group consisting of hollow glass spheres, Kevlar fibers, aramid fibers, ultra-high-molecular-weight polyethylene fiber, high-temperature polymer fiber, glass fiber, glass beads, super-hydrophobic silica, boron nitride, nickel wires, iron powders, steel powders, copper powder, titanium powder, tungsten powder and mixtures thereof.

25. The composition of claim 22, wherein the non-biodegradable filler comprises an advanced carbon material selected from the group consisting of graphite, graphene, carbon nanotubes, carbon black, carbon fiber, and mixtures thereof.

26. The composition of claim 22, wherein the non-biodegradable filler comprises a recycled waste material selected from the group consisting of rubber particles, ground tire powder, post-consumer plastics, post-industrial plastics and mixtures thereof.

27. The composition of claim 22, wherein the non-biodegradable filler comprises a naturally occurring inorganic material selected from the group consisting of talc, pumice, silica, nano clay, montmorillonite clay, and mixtures thereof.

28. A process for producing a composition according to claim 1, comprising the steps of
   providing about 1-99 wt % of a first polymer, about 0.1-15 wt % of a phenolic compound, about 0-40 wt % of an alcohol, and about 0.001-5 wt % of a Lewis acid catalyst;
   mixing the first polymer, first phenolic compound, alcohol, and Lewis acid catalyst to form a mixture.

29. The process of claim 28, further comprising the step of subjecting the mixture to strain hardening.

* * * * *